(12) United States Patent
Nuggehalli

(10) Patent No.: US 10,332,213 B2
(45) Date of Patent: Jun. 25, 2019

(54) EXPENSE REPORT SYSTEM WITH RECEIPT IMAGE PROCESSING BY DELEGATES

(71) Applicant: Jayasimha Nuggehalli, Cupertino, CA (US)

(72) Inventor: Jayasimha Nuggehalli, Cupertino, CA (US)

(73) Assignee: RICOH COMPANY, LTD., Tokyo (JP)

( * ) Notice: Subject to any disclaimer, the term of this patent is extended or adjusted under 35 U.S.C. 154(b) by 685 days.

(21) Appl. No.: 13/754,718

(22) Filed: Jan. 30, 2013

(65) Prior Publication Data

US 2013/0232041 A1 Sep. 5, 2013

Related U.S. Application Data

(63) Continuation-in-part of application No. 13/410,170, filed on Mar. 1, 2012, now Pat. No. 9,659,327.

(51) Int. Cl.
*G06Q 40/00* (2012.01)
*G06Q 10/06* (2012.01)
*G06Q 10/10* (2012.01)

(52) U.S. Cl.
CPC ............. *G06Q 40/12* (2013.12); *G06Q 10/06* (2013.01); *G06Q 10/103* (2013.01);
(Continued)

(58) Field of Classification Search
CPC ...... G06Q 40/12; G06Q 40/10; G06Q 40/128; G06Q 10/06; G06Q 10/103; G06Q 10/105
See application file for complete search history.

(56) References Cited

U.S. PATENT DOCUMENTS 5,689,620 A 11/1997 Kopec et al.
5,910,988 A 6/1999 Ballard
(Continued)

FOREIGN PATENT DOCUMENTS

EP 0 602 821 A2 6/1994
EP 1206 117 A2 5/2002
(Continued)

OTHER PUBLICATIONS

Fitzmaurice, George. "Form-centered workflow automation using an agent framework." Ma~ ter, s thesis, Brown Univ (1991).*
(Continued)

*Primary Examiner* — Asfand M Sheikh
(74) *Attorney, Agent, or Firm* — Hickman Palermo Becker Bingham LLP; Edward A. Becker

(57) ABSTRACT

A system and method are disclosed in an automated expense report system for identifying a delegated user and granting to the user delegate rights. At least one granted right includes one or more permissions to carry out certain operations in the expense report system such as permission to create an expense report, permission to access receipt data, permission to approve an expense report, or permission to view an expense report. At least one permission is associated with one or more workflows by which the operations are carried out. In one embodiment, data that identifies delegates is sent to an image capture device coupled to the expense report system and a delegated user carries out operations in the expense report system from the image capture device. In one embodiment, the expense report system keeps a database of the users and those delegating persons for whom a user is permitted to act.

20 Claims, 28 Drawing Sheets

(52) U.S. Cl.
CPC .......... *G06Q 10/105* (2013.01); *G06Q 40/10* (2013.01); *G06Q 40/128* (2013.12)

(56) References Cited

U.S. PATENT DOCUMENTS

| | | | |
|---|---|---|---|
| 6,918,038 B1 | 7/2005 | Smith et al. | |
| 6,991,158 B2 | 1/2006 | Munte | |
| 7,069,240 B2 | 6/2006 | Spero et al. | |
| 7,437,330 B1 | 10/2008 | Robinson et al. | |
| 7,831,978 B2* | 11/2010 | Schaad | G06Q 10/06316 718/106 |
| 8,014,604 B2 | 9/2011 | Tzadok et al. | |
| 8,131,798 B2 | 3/2012 | Mori | |
| 8,620,713 B2* | 12/2013 | Schaad | G06Q 10/06 705/7.21 |
| 8,639,719 B2* | 1/2014 | Fisher | G06F 16/487 707/776 |
| 8,849,691 B2* | 9/2014 | Sanabria | G06Q 10/06 705/7.26 |
| 9,165,391 B2 | 10/2015 | Pandipati | |
| 2004/0083134 A1 | 4/2004 | Spero et al. | |
| 2004/0103014 A1* | 5/2004 | Teegan | G06Q 10/10 705/7.13 |
| 2005/0024681 A1 | 2/2005 | Tehrani et al. | |
| 2005/0222944 A1 | 10/2005 | Dodson, Jr. et al. | |
| 2006/0256392 A1* | 11/2006 | Van Hoof | H04N 1/00209 358/402 |
| 2006/0285746 A1 | 12/2006 | Yacoub | |
| 2007/0124803 A1 | 5/2007 | Taraz | |
| 2007/0143674 A1 | 6/2007 | Daos et al. | |
| 2008/0212901 A1 | 9/2008 | Castiglia et al. | |
| 2009/0092318 A1 | 4/2009 | Berard | |
| 2009/0119574 A1 | 5/2009 | Gitlin et al. | |
| 2009/0119601 A1* | 5/2009 | Adachi | G06Q 10/10 715/753 |
| 2009/0198617 A1* | 8/2009 | Soghoian | G06Q 20/04 705/65 |
| 2010/0082454 A1 | 4/2010 | Narayanaswami | |
| 2010/0188419 A1 | 7/2010 | Ratnakar et al. | |
| 2010/0299763 A1 | 11/2010 | Marcus et al. | |
| 2011/0280481 A1 | 11/2011 | Radakovic et al. | |
| 2012/0047052 A1 | 2/2012 | Patel | |
| 2012/0185368 A1 | 7/2012 | Schloter et al. | |
| 2013/0085904 A1 | 4/2013 | Menon | |
| 2013/0129218 A1 | 5/2013 | Barrett et al. | |
| 2013/0201307 A1 | 8/2013 | Schloter | |
| 2013/0230205 A1 | 9/2013 | Nuggehalli | |
| 2013/0230246 A1 | 9/2013 | Nuggehalli | |
| 2013/0232040 A1 | 9/2013 | Nuggehalli | |
| 2014/0280962 A1* | 9/2014 | Schultz | H04L 67/1074 709/226 |

FOREIGN PATENT DOCUMENTS

| | | |
|---|---|---|
| JP | 2011/237840 A | 11/2011 |
| JP | 2011 237840 A | 11/2011 |
| WO | WO 2004/111896 A1 | 12/2004 |

OTHER PUBLICATIONS

U.S. Appl. No. 13/774,992, filed Feb. 22, 2013, Office Action, dated Mar. 2, 2015.

U.S. Appl. No. 13/410,170, filed Mar. 1, 2012, Office Action, dated Mar. 24, 2014.

Gutev, Stanislav, "Information Extraction from Images of Shopping Receipts", Master of Science of Informatics University of Edunburg, dated 2011, 54 pages.

European Patent Office, "Search Report" in application No. 13156695. 2-1958, dated May 28, 2013, 8 pages.

European Patent Office, "Search Report" in application No. 13169739. 3-1958, dated Nov. 27, 2013, 13 pages.

U.S. Appl. No. 13/523,732, filed Jun. 14, 2012, Final Office Action, dated Jan. 10, 2014.

U.S. Appl. No. 13/410,170, filed Mar. 1, 2012, Office Action, dated Jan. 31, 2013.

U.S. Appl. No. 13/410,170, filed Mar. 1, 2012, Office Action, dated Oct. 2, 2014.

U.S. Appl. No. 13/774,992, filed Feb. 22, 2013, Final Office Action, dated Jun. 2, 2015.

U.S. Appl. No. 13/410,170, filed Mar. 1, 2012, Final Office Action, dated Jun. 2, 2015.

U.S. Appl. No. 13/774,992, filed Feb. 22, 2013, Notice of Allowance, dated Sep. 9, 2015.

Nuggehalli, U.S. Appl. No. 13/410,170, filed Mar. 1, 2012, Notice of Allowance, dated Jan. 25, 2017.

European Patent Office, "Search Report" in application No. 13169739. 3-1958, dated Oct. 30, 2017, 10 pages.

* cited by examiner

FIG. 14

Expense Report Name: Report 1

Expense Items — 1402
- Item 1 — 1408 ◼
- Item 2 ☐
- Item 3 ☐
- Item 4 ☐

Item Description — 1404

Item 1 — 1410

- Vendor Name: Vendor ABC — 1412
- Date: 12/28/2011 — 1414
- Amount: 10.10 — 1416
- Credit Card Number: xxxx xxxx xxxx 3000 — 1418
- Credit Card Type: Amex — 1420

○ Cash — 1424
● Corporate Credit Card — 1426
○ Personal Credit Card — 1428

Receipt Image — 1406

- 1436 — Vendor ABC
- Date: 12/28/2011 — 1438
- Item 1  10.00 — 1442
- Item 2  12.00 — 1440
- Item 3  44.12
- Item 4  33.12
- Total   99.24
- Card Type: Amex — 1444
- Card number: xxxx xxxx xxxx 3000 — 1446

[Cancel] — 1430   [Save] — 1432   [Submit] — 1434

1400

| User ID | First Name | Last Name | Email | GroupID | Title | Phone |
|---|---|---|---|---|---|---|
| RSmith | Rob | Smith | Rob.smith@acme.com | 2 | VP | |
| JWang | James | Wang | James.wang@acme.com | 1 | Admin | |
| JDoe | Jane | Doe | Jane.doe@acme.com | 2 | Admin | |
| TCook | Tim | Cook | Tim.cook@acme.com | 2 | Director | |
| NLu | Nacy | Lu | Nancy.Lu@acme.com | 1 | Manager | |

| ID | User ID | Delegate ID | Delegate Rights | Authentication Token |
|---|---|---|---|---|
| 1 | JDoe | RSmith | 0x0F | 1243dd4323 |
| 2 | JDoe | NLu | 0x0E | 23dfdfdff |
| 3 | JWang | RSmith | 0x0C | 22dgdgfgfg |
| 4 | JWang | NLu | 0x0E | sgf32aaa33 |
| 5 | JWang | TCook | 0x0F | se332rtww |

FIG. 22B

| Scan to Expense System | | |
|---|---|---|
| 2332 — User: Jane Smith | Expense Reports | |
| 2334 — Office Supplies | | |
| 2336 — Computer Accessories | | |
| 2338 — Business Trip to Paris | | |

FIG. 23E

| Scan to Expense System | | |
|---|---|---|
| 2340 — User: Jane Smith | Expense Items | Business T |
| 2342 — Office Supplies | | |
| 2344 — Computer Accessories | | |
| 2346 — Business Trip to Paris | | |

FIG. 23F

| A. Scan to Receipt Data | B. Scan to Expense Report | C. Scan to Expense Item |
|---|---|---|
| | 2410 — Scan to Expense System — Mode [Color] [Gray scale] Format [PDF] [JPG] Duplex [Off] [On] Size [Auto] [LTR] [11x17] [Scan]<br><br>Step 3: Scan Setting Screen | 2416 — Scan to Expense System — User: Jane Smith  Expense Items  Business T<br>Office Supplies<br>Computer Accessories<br>Business Trip to Paris<br><br>Step 3: Expense Item List (Select Expense Item) |
| | | 2418 — Scan to Expense System — Mode [Color] [Gray scale] Format [PDF] [JPG] Duplex [Off] [On] Size [Auto] [LTR] [11x17] [Scan]<br><br>Step 4: Scan Setting Screen |

FIG. 24B

EXPENSE REPORT SYSTEM WITH RECEIPT IMAGE PROCESSING BY DELEGATES

RELATED APPLICATION DATA AND CLAIM OF PRIORITY

This application is a continuation-in-part of U.S. application Ser. No. 13/410,170, filed Mar. 1, 2012, and titled "Expense Report System With Receipt Image Processing", the contents of which application is incorporated by reference for all purposes as if fully set forth herein.

FIELD OF THE INVENTION

The present invention relates to a system and method for managing expense data for expense reports and more particularly to a system and method in which operations are carried out by delegates.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Currently, an automated expense report system is operated by the person incurring the reported expenses. Often this person, usually an executive of an organization, is away from the system or otherwise unable to operate the system. However, the credentials of this person are needed to operate the system.

SUMMARY

An embodiment provides a way for a delegated person to operate the automated expense report system in a trusted manner. In the embodiment, the delegated person, acting for the delegating person, can operate the system to capture data from receipt images and to automatically associate them with credit card transactions for an expense report.

One embodiment is an expense management system that includes an expense report system. The expense report system includes a delegation manager that is coupled to an image capture device, which is operated by one user of a plurality of users of the expense management system, to transmit delegate data in response to a request of the one user. The delegate data includes at least one first identifier that identifies a delegating person and at least one second identifier that identifies the one user as a delegated user for the at least one delegating person. The one user is granted a particular set of delegate rights, and one or more delegate rights in the particular set of delegate rights specifies one or more workflows that the one user is permitted to execute in the expense report system as the delegated user of the at least one delegating person. The expense report system permits the one user to execute the one or more workflows permitted by the particular set of delegate rights granted to the one user. The expense management system further includes a receipt image processing service that includes an OCR and data capture engine that optically recognizes characters in receipt image data obtained from the image capture device to provide receipt data in accordance with at least one of the workflows.

Another embodiment is a method for providing delegated operation in an expense report system. The method includes transmitting to an image capture device, that is operated by one user of a plurality of users, delegate data that includes at least one first identifier that identifies a delegating person and at least one second identifier that identifies the one user as a delegated user for the at least one delegating person, where the one user is granted a particular set of delegate rights, and one or more delegate rights in the particular set of delegate rights specifies one or more workflows that the one user is permitted to execute in the expense report system as the delegated user of the at least one delegating person. The method further includes receiving receipt image data for a transaction from the image capture device, receiving receipt data that includes one or more data items pertaining to the transaction, where the one or more data items are obtained from characters optically recognized in the receipt image data, and where the receipt data includes data indicating that the transaction is a credit card transaction. The method further includes creating expense data for an expense report, where the expense data includes the receipt data and the receipt image data associated with the receipt data for the transaction, where the receipt data includes credit card data relating to the credit card transaction, and where creating the expense data for the expense report includes executing in the expense report system the one or more workflows permitted by the particular set of delegate rights granted to the one user.

BRIEF DESCRIPTION OF THE DRAWINGS

In the figures of the accompanying drawings, like reference numerals refer to similar elements:

FIG. 14 is a depiction, in one embodiment, of expense data;

FIG. 22B depicts an example user list and an example delegate list;

FIGS. 23A-23G depict an example scanner interface;

FIG. 23A depicts a login screen;

FIG. 23B depicts a screen for scan workflow selection;

FIG. 23C depicts a screen for user selection;

FIG. 23D depicts a screen for user selection;

FIG. 23E depicts a screen for displaying an expense report list;

FIG. 23F depicts a screen for displaying an expense item list;

FIG. 23G depicts a screen for setting scan parameters; and

FIGS. 24A-B depict a set of screens detailing a workflow according to an embodiment.

DETAILED DESCRIPTION

Overview

An embodiment obtains data from a receipt and matches the data with credit card information, if the transaction recorded on the receipt is a credit card transaction. An expense report is generated based the receipt data and the credit card transaction data. In the description that follows, it is understood that while the term "credit card" is used for purposes of explanation, the term includes, without limitation any form of payment that involves the use of crediting or debiting of an account and is not limited to credit, debit, or ATM cards. For example, the approach is applicable to transactions involving the use of credit cards, debit cards and ATM cards, as well as transactions that are performed using wireless communications, for example, via mobile devices, PDAs, cell phones, tablet computers, laptop computers, etc.

Description

Figure 1:
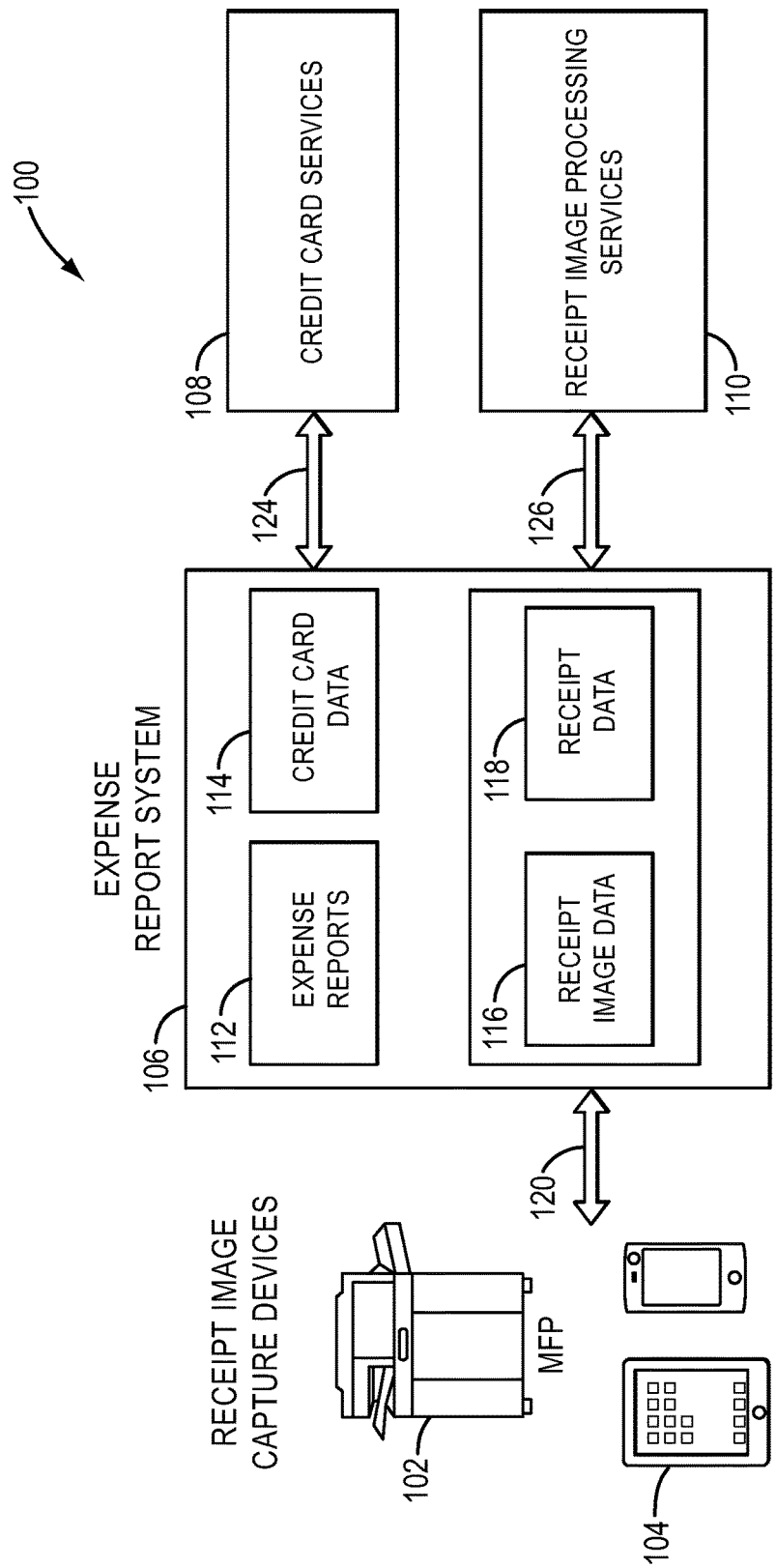
FIG. 1 depicts an overall system configuration according to one embodiment.

FIG. 1 depicts a system configuration 100 according to an embodiment. The system configuration of FIG. 1 includes receipt image capture devices such as MFP 102 and mobile devices 104, an expense report system 106, credit card services 108, and receipt image processing services 110. The expense report system 106 includes expense reports 112, credit card data 114, receipt image data 116, which is the electronic version of the receipt image, and receipt data 118. The expense report system 106 is connected to the receipt image capture devices 102, 104 via communications link 120, to the credit card services 108 via communications link 124, and to receipt image processing services 110 via communications link 126. In one embodiment, link 120 is an Internet connection, link 124 is an Internet connection, and link 126 is an applications programming interface (API), such as an interface operating in accordance with the Simple Object Access Protocol (SOAP) or Representative State Transfer (REST), or Web APIs. In another embodiment, link 120 is an intranet connection, link 124 is an intranet connection, and link 126 is an applications programming interface (API), such as SOAP/REST or Web APIs.

The expense report system receives the receipt image data 116 via link 120 from the receipt image capture devices 102, 104, credit card data 114 from the credit card services 108 via link 124, and receipt data 118 from receipt image processing services 110 via link 126. Receipt image processing services 110 receives the receipt image data 116 from the expense report system 106, optically recognizes the characters in the receipt image data 116, and extracts relevant receipt data 118 from the receipt image data 116. Once the expense report system 106 obtains the receipt data 118, the expense report system 106 associates the receipt data 118 and receipt image data 116 with respective credit card data 114 and creates expense data for an expense report 112.

Figure 2:
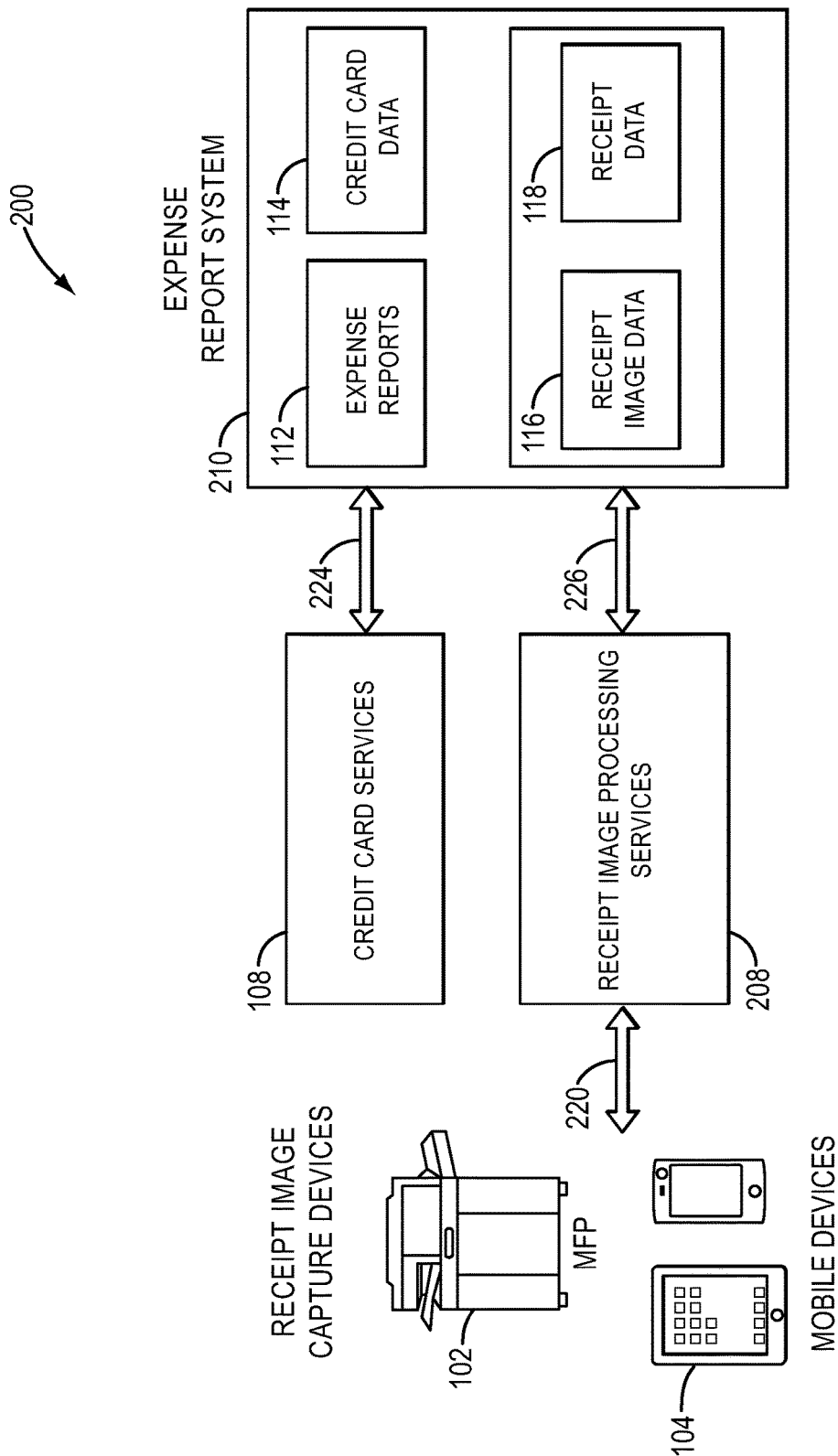
FIG. 2 depicts an overall system configuration according to another embodiment.

FIG. 2 depicts an overall system configuration 200 according to another embodiment. The system configuration 200 of FIG. 2 includes receipt capture image devices such as MFP 102 and mobile devices 104, credit card services 108, receipt image processing services 208, expense report system 210. The expense report system 210 includes expense reports 112, credit card data 114, receipt image data 116, and receipt data 118. The expense report system 210 connects to receipt image processing services 208 via communications link 226 and to the credit card services 108 via communications link 224. Receipt image processing services 208 connects to the receipt image capture devices 102, 104 via communications link 220. In one embodiment, link 220 is an Internet connection, link 224 is an Internet connection, and link 226 is an API, such as SOAP/REST or Web APIs. In another embodiment, link 220 is an intranet/Internet connection, link 224 is an Internet connection, and link 226 is an API, such as SOAP/REST or Web APIs.

The expense report system 210 receives the receipt image data 116 from receipt image processing services 208 via link 226, credit card data 114 from the credit card services 108 via link 224, and receipt data 118 from receipt image processing services 208 via link 226. Receipt image processing services 208 receives the receipt image data 116 from the receipt image capture devices 102, 104 via link 220, optically recognizes the characters in the receipt image data 116, and extracts relevant receipt data 118 from the receipt image data 116. Once the expense report system 210 obtains the receipt data 118, the expense report system 210 associates the receipt data 118 and receipt image data 116 with respective credit card data 114 and creates expense data for an expense report 112.

Figure 3:
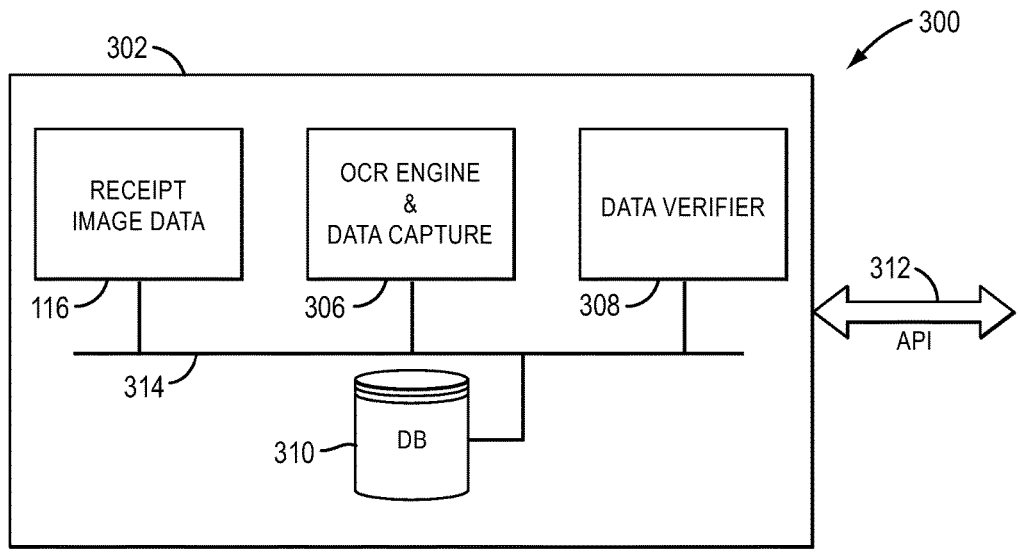
FIG. 3 depicts a high-level diagram of receipt image processing service.

FIG. 3 depicts an example implementation of receipt image processing services 208. The implementation includes receipt image data 116, an OCR Engine 306 with data capture capability, a data verifier 308, and an Application Programming Interface (API) 312. The receipt image data 116, the OCR Engine 306 with data capture, the data verifier, 308 and the database 310 are communicatively coupled, for example, via a bus 314. In one embodiment, bus 314 is a network connection.

The receipt image data 116 is stored in either persistent or non-persistent storage in a system hosting receipt image processing services 300. The OCR engine 306 is aided by a data verifier 308, which includes a user interface, to help increase the accuracy of the extracted receipt data. The database 310 stores the receipt data extracted from the receipt image data 116. The Application Programming Interface 312 provides a programming interface 312 for communicating with external systems such as the expense report system 210 in FIG. 2 or the image capture devices 102, 104, in FIG. 2.

Figure 4:
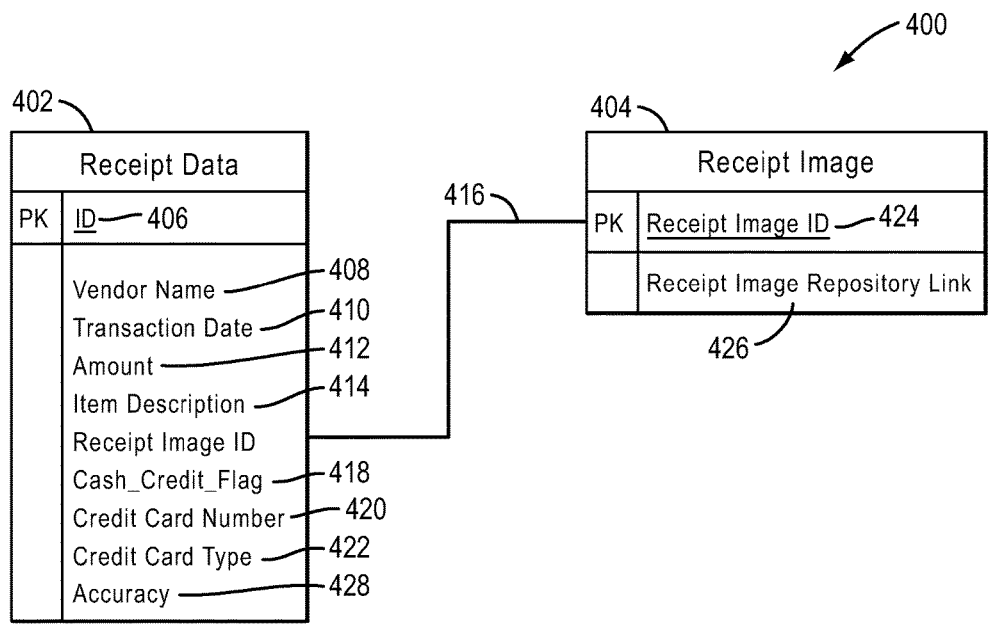
FIG. 4 depicts a high-level data model within the receipt processing system.

FIG. 4 depicts, in one embodiment, a high-level data model 400 within the system that provides receipt image processing services 110 in FIG. 1. Other data models are possible and embodiments are not limited to the particular data items depicted and described. The data items used may vary, depending on a particular implementation. The high-level data model 400 includes receipt data 402 and receipt image information 404. Receipt data 402 includes the following data items: vendor name or merchant name 408, transaction date 410, transaction amount 412, an item description 414, receipt image ID 416, a cash or credit/debit transaction flag 418, a credit/debit card number 420, a credit/debit card type 422, an accuracy or uncertainty parameter 428, and an ID 406, which is the primary key (PK) for the data items in the receipt data 402. Receipt image information 404 includes the following data items: a receipt image repository link 426 and a receipt image ID 424, which is the primary key for the receipt image information 404. The receipt image ID data item 416 contains receipt image ID 424 when the receipt image information 404 is associated with the receipt data 402. The receipt image ID 424 identifies the receipt image data (the electronic version of the receipt) that was obtained from the image capture devices 102, 104, in FIG. 1 or FIG. 2. The receipt image repository link 426 is a pointer to a storage area that contains the receipt image data 116. The combination of the receipt image ID 424 and the receipt image repository link 426 provides a unique identifier for the receipt image data in the repository.

Data items 408, 410, 412, 414, 418, 420, 422 are recognized by an OCR engine 306 in FIG. 3. According to one embodiment, one or more uncertainty parameters, such as parameter 428, are associated with one or more of these data items. An uncertainty parameter provides an indication of the expected accuracy of the OCR process with respect to one or more corresponding data items. Uncertainty parameters may be expressed in a wide variety of forms, depending upon a particular implementation. For example, an uncertainty parameter may be expressed as a numerical value between 0 and 1, where 0 represents the lowest level of uncertainty and a 1 represents the highest level of certainty. Uncertainty parameters may be generated and stored by receipt image processing services 300.

According to one embodiment, the uncertainty parameters are displayed on a graphical user interface to provide a visual indication to a user of the expected accuracy of the OCR process with respect to certain data items. For example, when the uncertainty parameter for a data item is below a threshold, the system depicts blank values in the user interfaces depicted in FIG. 10, thereby flagging a user as to the uncertainty of the data. In the data verification user interfaces 800, 900, 1000, 1100, 1200 depicted, a user has an option to correct the data value and area on the receipt image data and associate the area with respective data item of interest. When a user makes such a correction, the changes are fed back to the OCR engine 306 in FIG. 3 to improve accuracy when OCR engine 306 comes across similar receipt image data.

Figure 5:
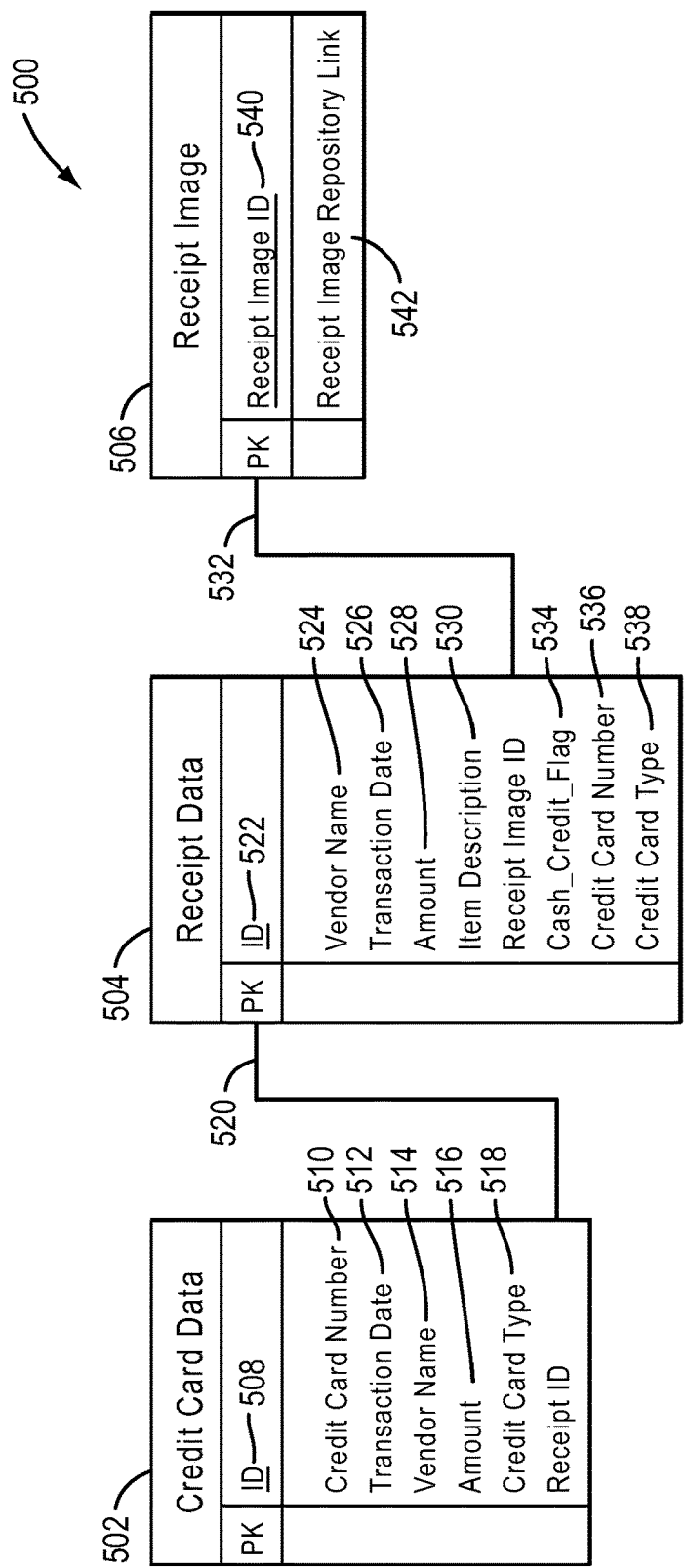
FIG. 5 depicts a high-level data model within the expense report system.

FIG. 5 depicts, in one embodiment of a high-level data model 500 within the expense report system 106, in FIGS. 1 and 210 in FIG. 2. Other data models are possible and embodiments are not limited to the particular data items depicted and described. The data items used may vary, depending on a particular implementation. The high-level data model 500 includes credit card data 502, receipt data 504 and receipt image information 506. Credit card data 502 includes the following data items: a credit/debit card number 510, transaction date 512, a vendor/merchant name 514, a transaction amount 516, a credit/debit card type 518, and a receipt ID 520, and ID 508, which is the primary key for the data items in credit card data 502. Receipt data 504 includes the following data items: vendor/merchant name 524, transaction date 526, transaction amount 528, item description 530, receipt image ID 532, cash-credit flag 534, credit/debit card number 536, credit/debit card type 538, and ID 522, which is the primary key for the data items in receipt data 504. Receipt image information 506 includes the following data items: a receipt image repository link 542, and receipt image ID 540, which is the primary key for the receipt image information 506. Receipt ID 520 contains data item ID 522 when the credit card data 502 is associated with receipt data 504. Receipt image ID 532 contains receipt image ID 540 when the receipt data 504 is associated with receipt image information 506. The receipt image repository link 542 is a pointer to a storage area that contains the receipt image data. The combination of the receipt image ID 540 and the receipt image repository link 542 provides a unique identifier for storing and retrieving the receipt image data in a repository, as database 310 in FIG. 3.

Figure 6:
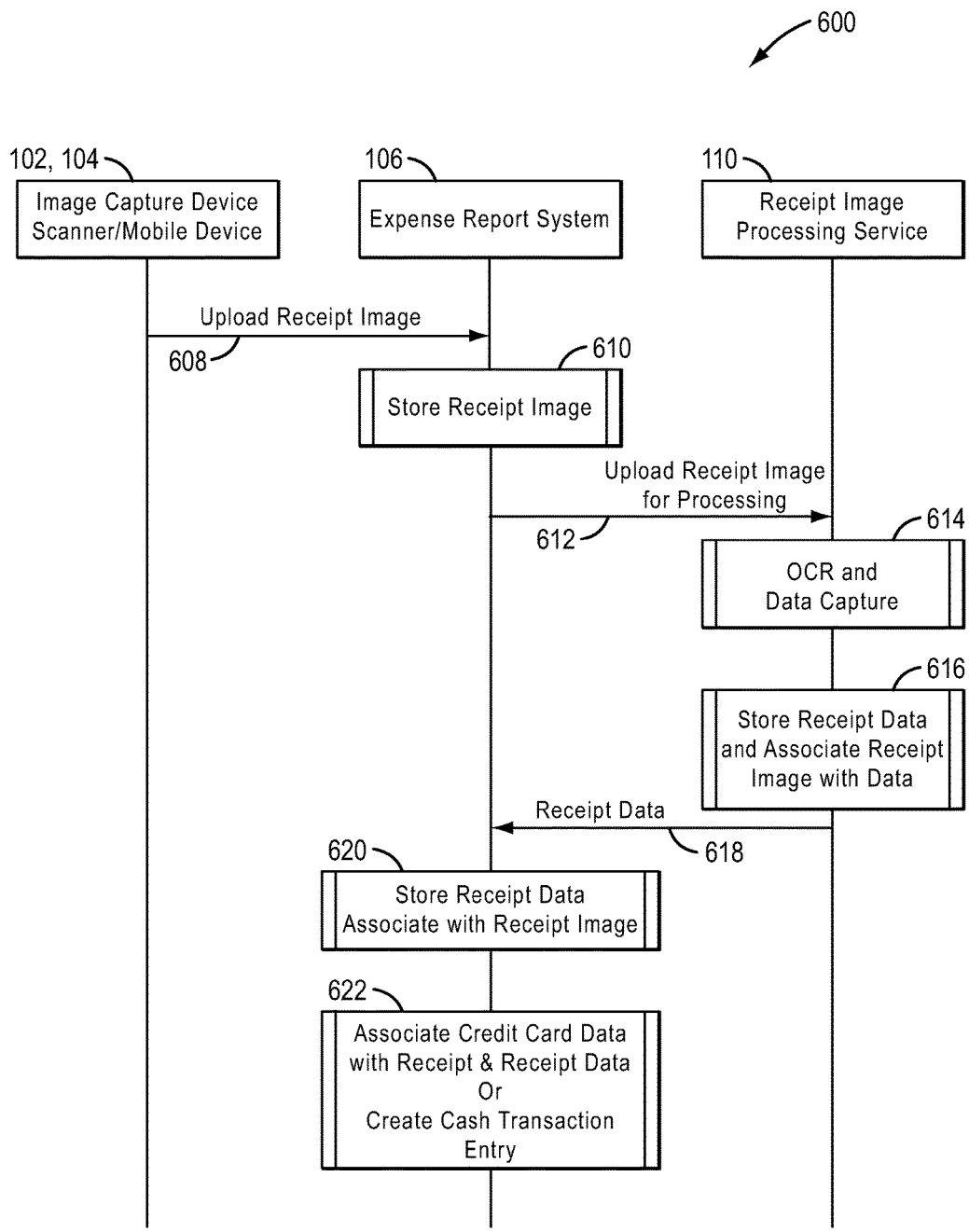
FIG. 6 depicts a data flow diagram with respect to the system of FIG. 1.

FIG. 6 depicts a data flow diagram with respect to the system depicted in FIG. 1. In the figure, data flows among the image capture devices 102, 104, the expense report system 106, and receipt image processing services 110. In step 608, the image capture devices 102, 104 send receipt image data 116 to the expense report system 106. In step 610, the expense report system 106 stores the receipt image data 116. In step 612, the expense report system 106 sends the uploaded receipt image data 116 to receipt image processing services 110. In step 614, receipt image processing services 110 performs optical character recognition and data capture on the receipt image data 116. In step 616, receipt image processing services 110 stores the receipt data 118 and associates the receipt image data 116 with the receipt data 118. In step 618, receipt image processing services 110 sends the receipt data 118 to the expense report system 106, which stores, in step 620, the receipt data 118 and associates the receipt image data 116 with the receipt data 118. In step 622, the expense report system 106 associates credit card data 114 with the receipt data 118 and the receipt image data 116 to create expense data for an expense report 112 or creates expense data for a cash transaction in an expense report 112. In one embodiment, in step 614, receipt image processing services 110 performs OCR with the help of a user who compares the receipt image data 116 with the receipt data 118 to determine whether the OCR engine 306 has correctly captured the receipt data 118 and whether all of the receipt data 118 is present. In one embodiment, a user trains the OCR engine 306 if the receipt data 118 is found to be missing a data item by supplying to the OCR engine 306 an appropriate area on the receipt image data 116 from which to extract a data item and an association that links the area with a data item in the receipt data 118.

Figure 7:
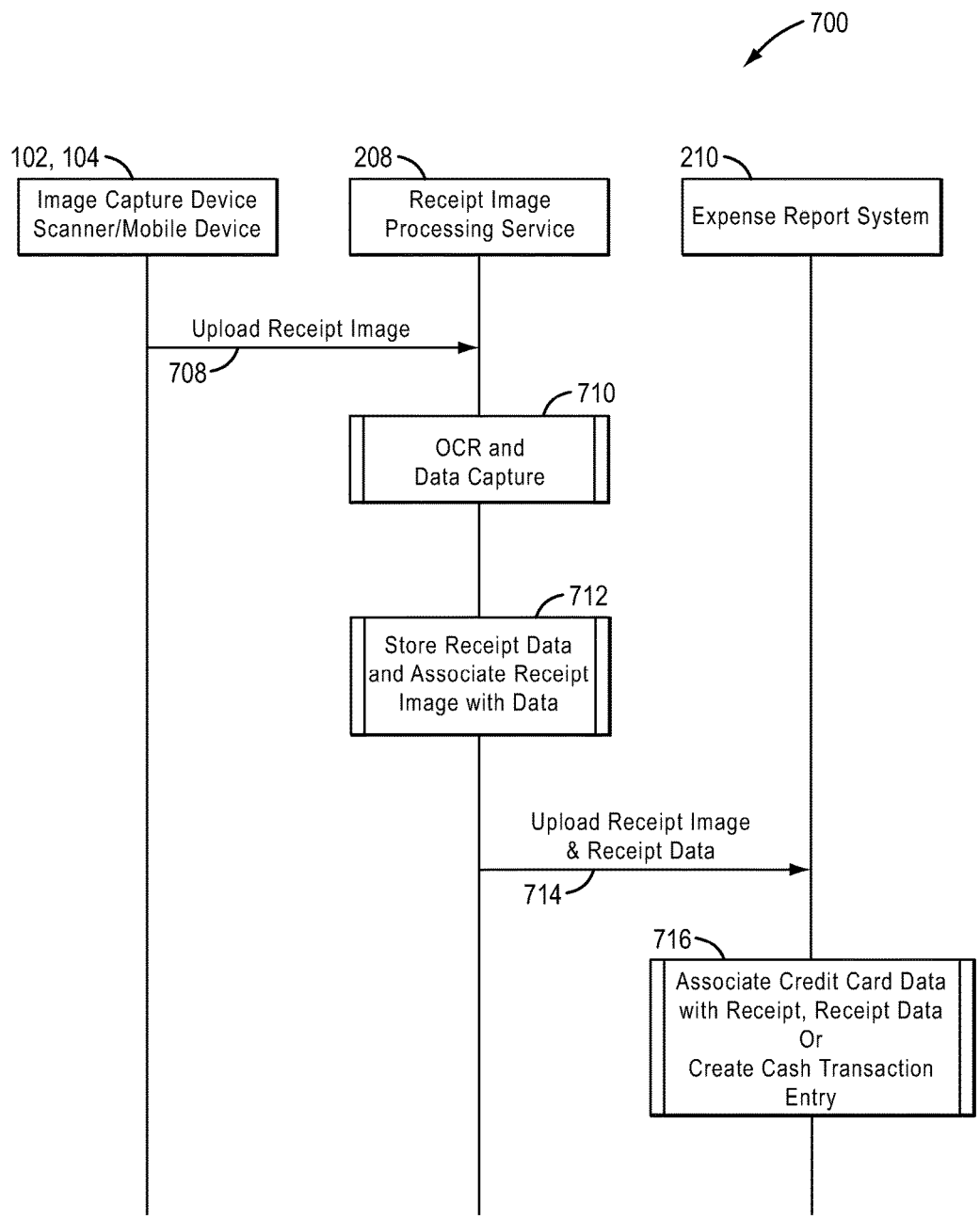
FIG. 7 depicts a data flow diagram with respect to the system of FIG. 2.

FIG. 7 depicts a data flow diagram with respect to the system depicted in FIG. 2. The data flows among the image capture devices 102, 104, receipt image processing services 208, and the expense report system 210. In step 708, the image capture devices 102, 104 send receipt image data 116 to receipt image processing services 208. In step 710, receipt image processing services 208 performs the OCR and data capture of the receipt image data 116. In step 712, receipt image processing services 208 stores the receipt data 118 and associates the receipt image data 116 with the receipt data 118. In step 714, receipt image processing services 208 sends the receipt image data 116 and receipt data 118 to the expense report system 210. In step 716, the expense report system 210 associates the credit card data 114 with the receipt data 118 and the receipt image data 116 to create expense data for an expense report 112 or creates expense data for a cash transaction in an expense report 112. Other details of receipt image processing services 208 are the same as those in FIG. 6.

Figure 8:
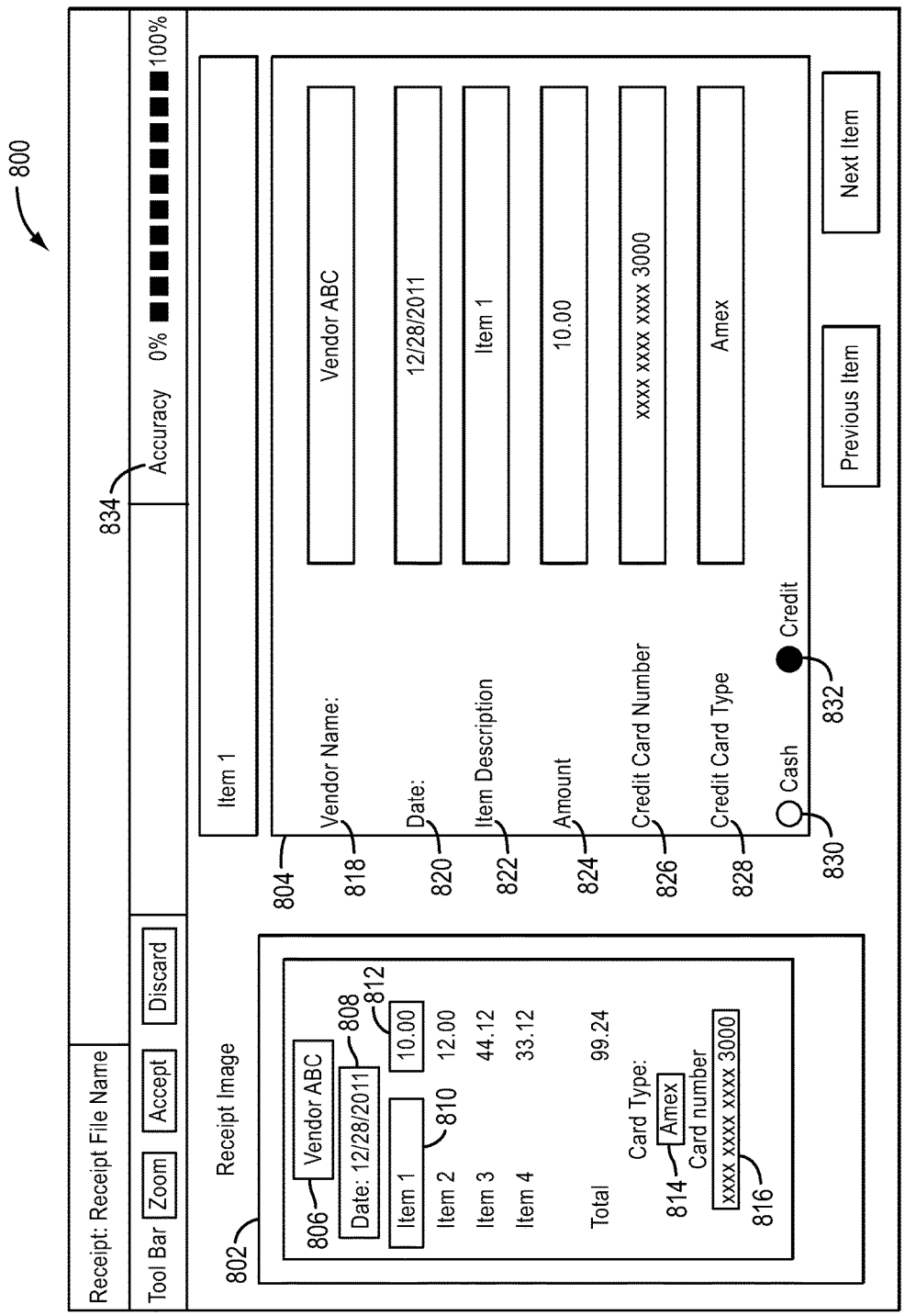
FIG. 8 depicts an example user interface of the data verification system.
Figure 9:
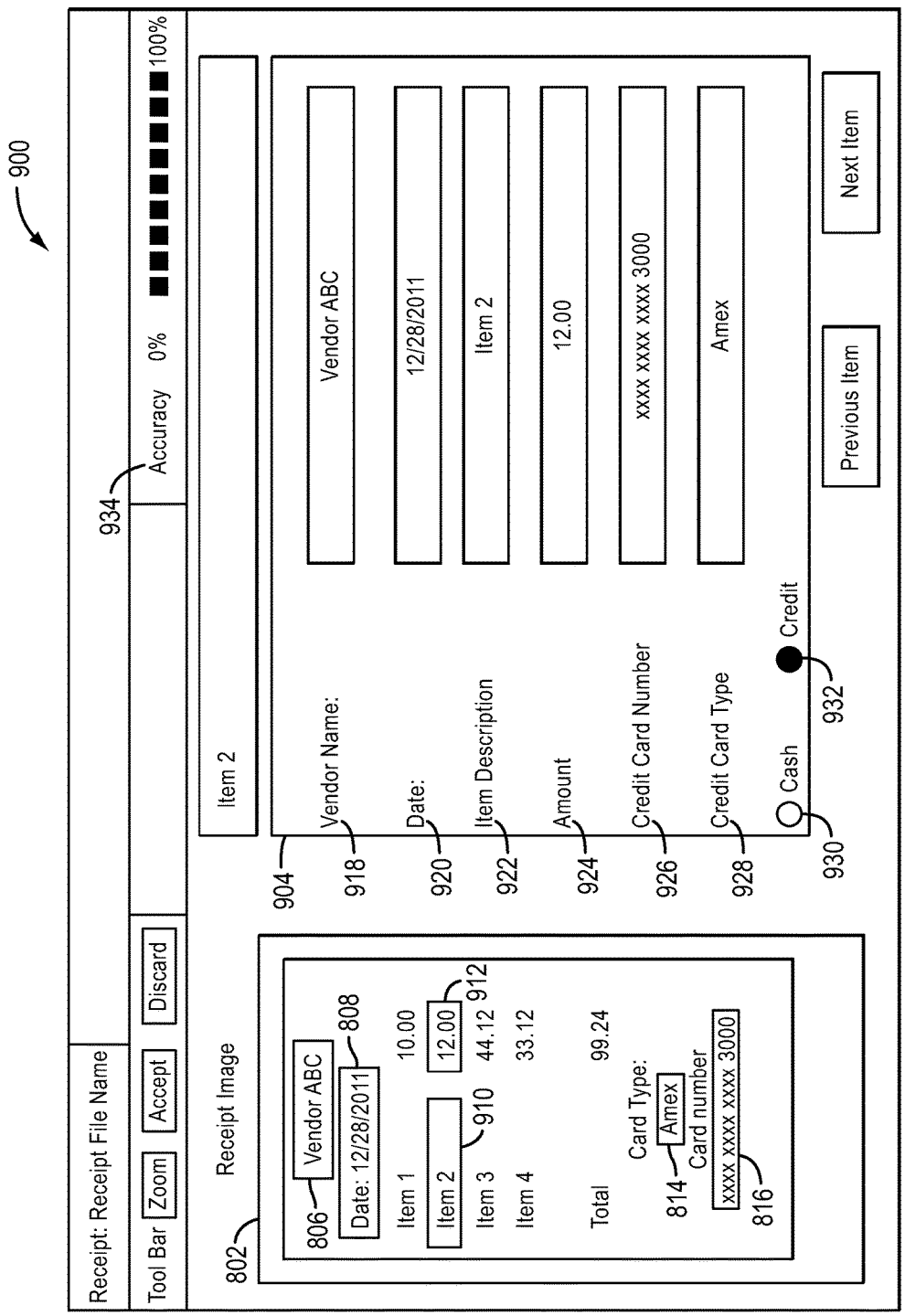
FIG. 9 depicts an example user interface of the data verification system.
Figure 10:
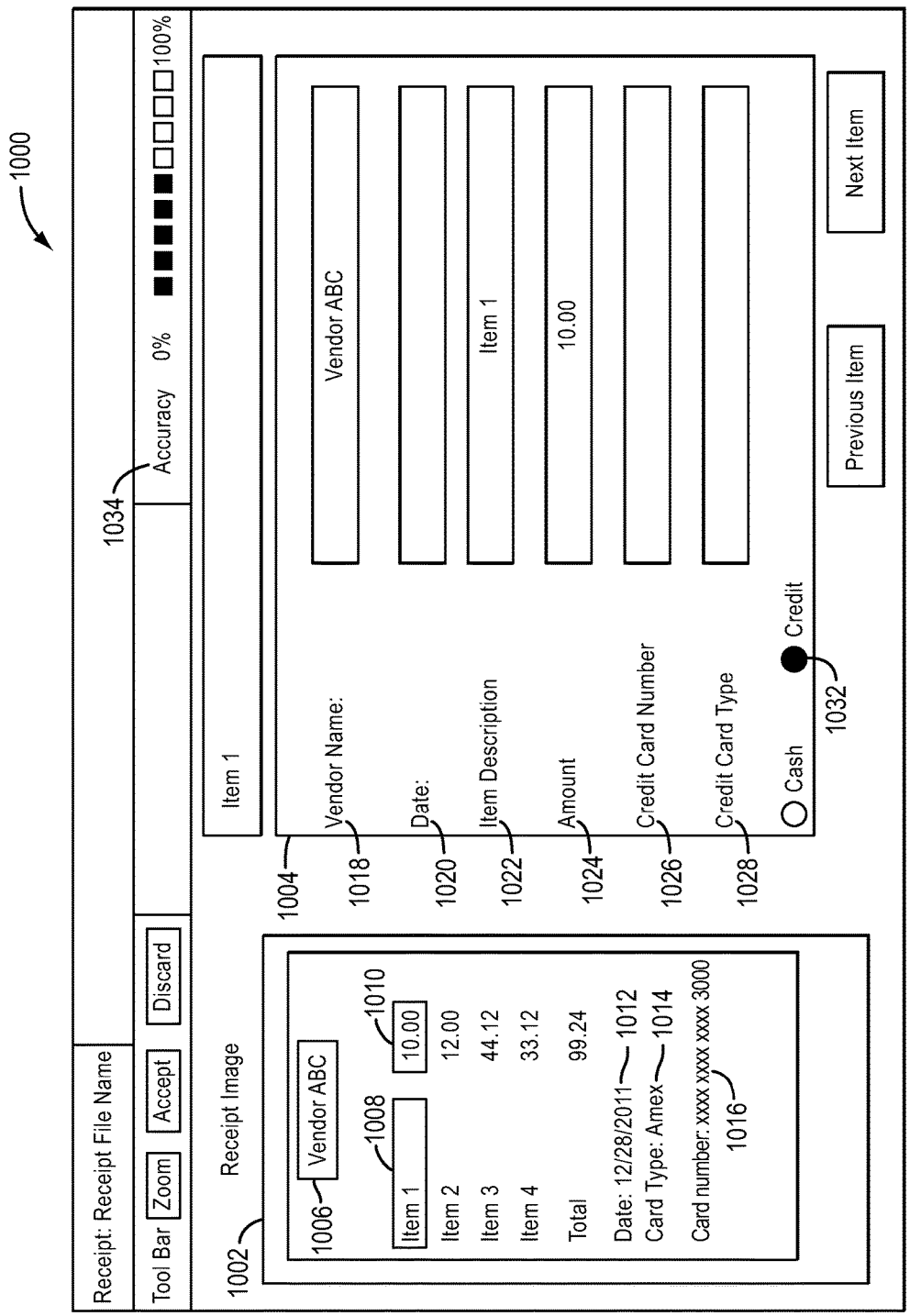
FIG. 10 depicts a case in which the OCR engine is unable to identify the data items correctly.
Figure 11:
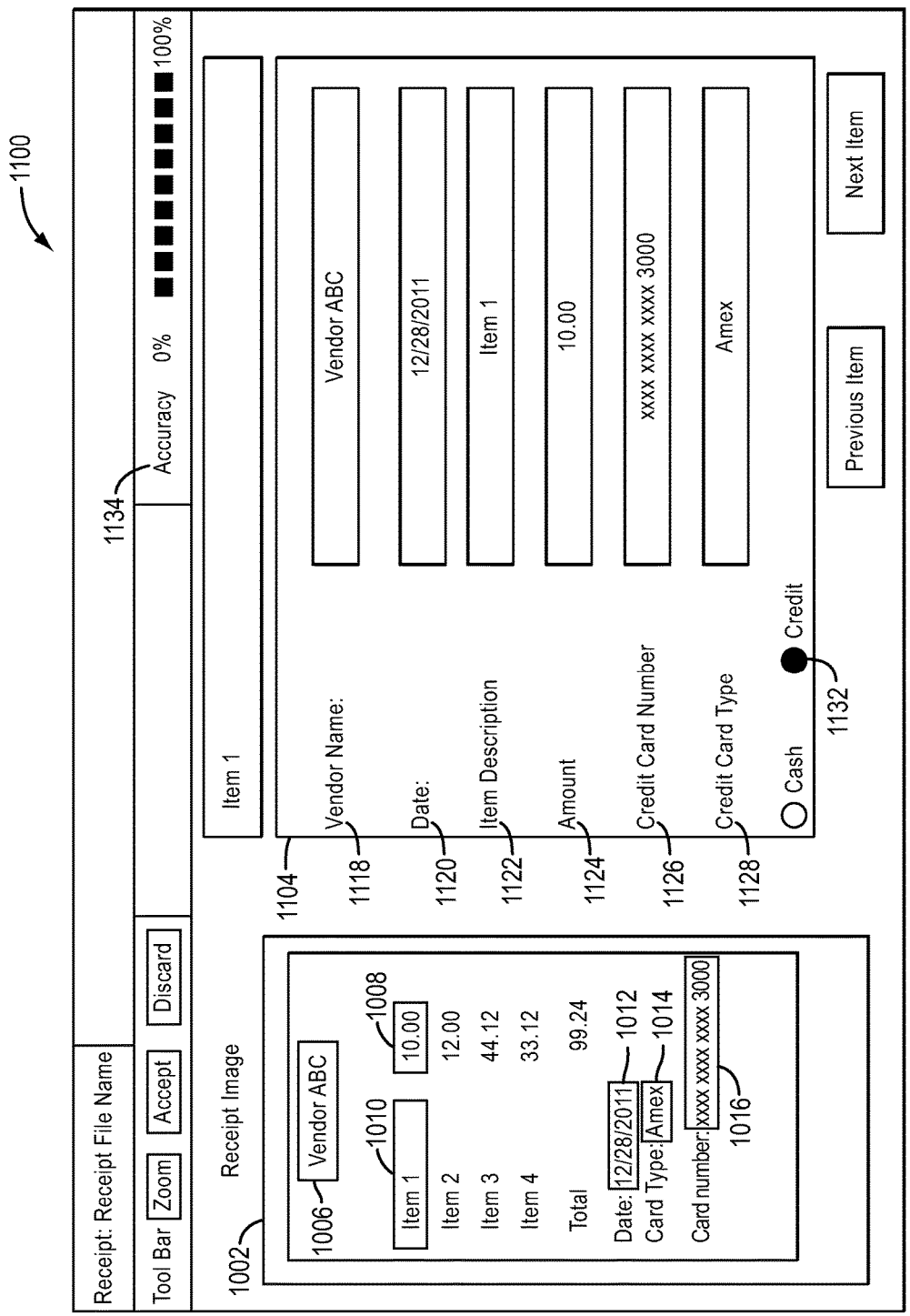
FIG. 11 depicts a user association of an image with data items to aid the OCR engine.
Figure 12:
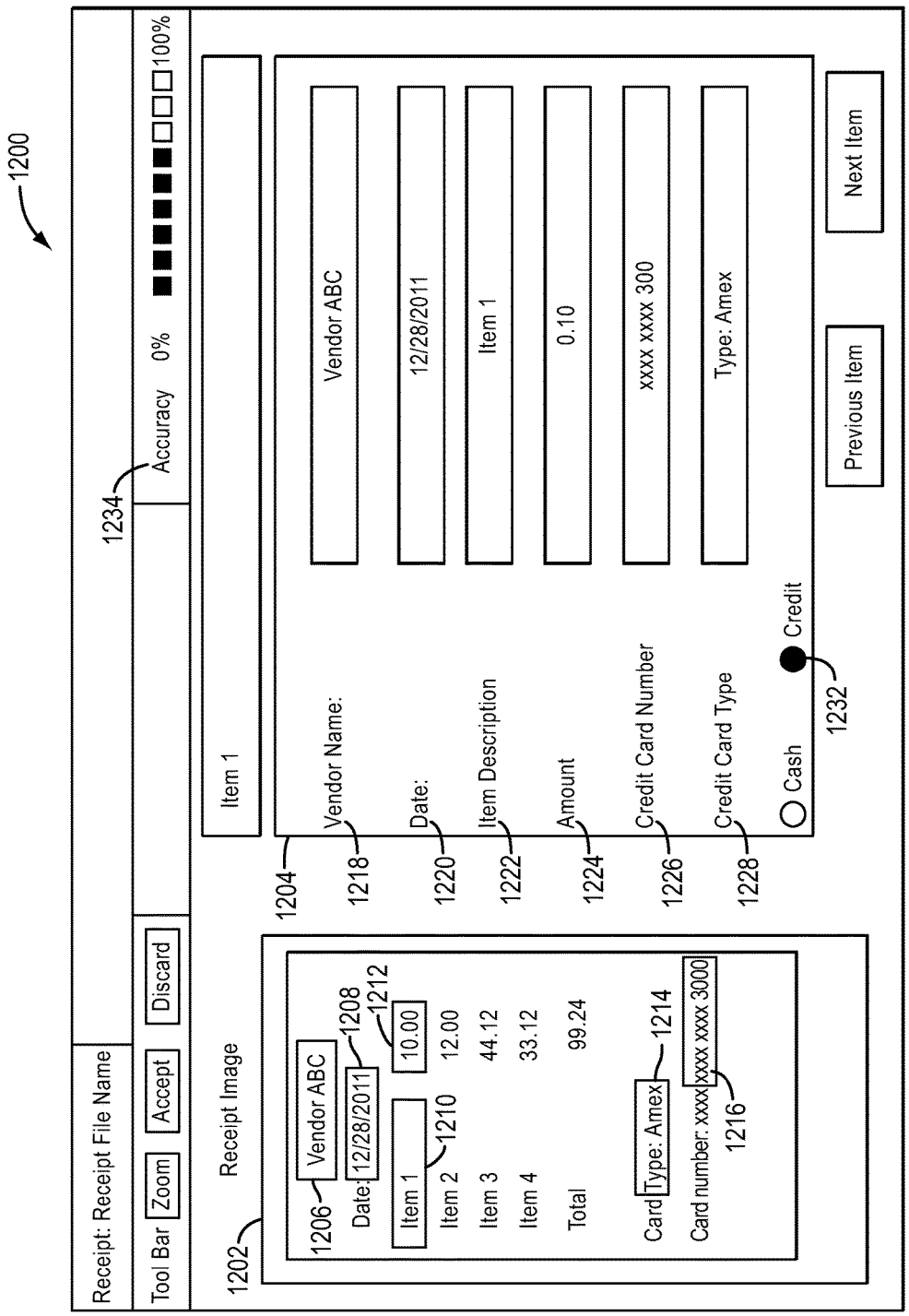
FIG. 12 depicts a case in which the OCR engine is unable to identify the data items accurately.
Figure 13:
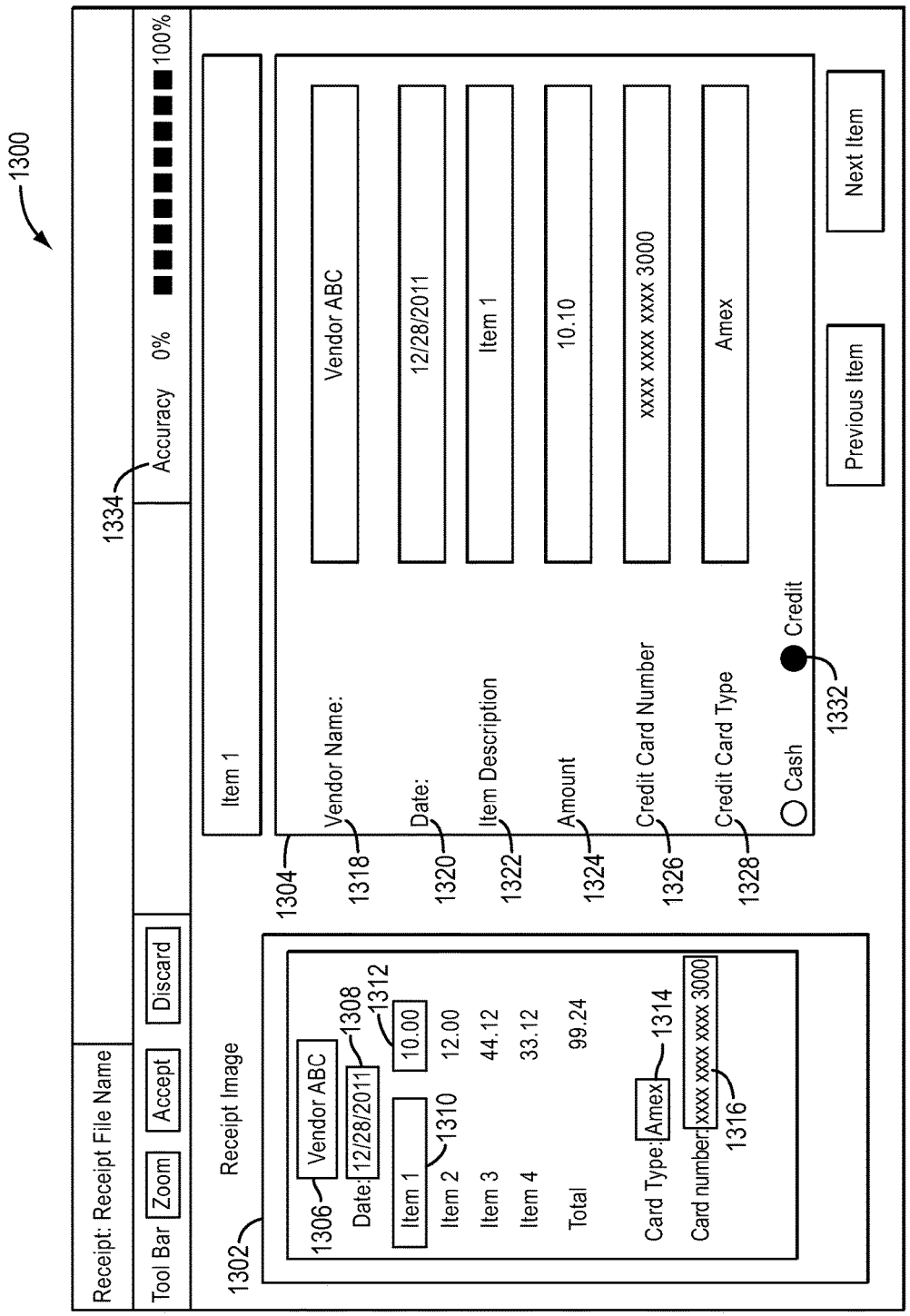
FIG. 13 depicts a user's correction for the errors depicted in FIG. 12.

FIGS. 8, 9, 10, 11, and 12 depict example user interfaces operable in conjunction with the data verifier 308 in FIG. 3. FIGS. 8 and 9 illustrate a receipt image and receipt data for items 1 and 2 on the receipt image, respectively. FIGS. 10 and 11 illustrate the case in which the OCR engine 306 in FIG. 3 fails to capture one or more data items and a user supplies the missing item or items. FIGS. 12 and 13 illustrate the case in which the OCR engine 306 captures one or more data items incorrectly and a user corrects the incorrect items.

The example user interface depicted in FIG. 8 includes data areas in the receipt image 802, and data items in the receipt data for a particular item, item 1, in the receipt image 802 when the data is correctly captured by the OCR engine 306. The data areas in the receipt image 802 include a vendor/merchant name 806, the transaction date 808, the item 1 description 810, the transaction amount 812, a credit/debit card type 814, and the credit/debit card number 816. The receipt data 804 for item 1 includes the vendor/merchant name 818, the transaction date 820, the item 1 description 822, the transaction amount 824, the credit/debit card number 826, and the credit/debit card type 828. Additionally, the receipt data 804 depicted includes a "cash" radio button 830 and a "credit" radio button 832, which for the case depicted is marked, because the item 1 transaction is a credit transaction. The figure illustrates that the OCR engine 306 identified the receipt data 804 for item 1 correctly and accurately because each data area in the receipt image 802 pertaining to item 1 has a corresponding data item in the receipt data 804 for item 1 that is correctly captured. Additionally, an accuracy scale 834 indicates to the user that the receipt image 802 is correct and accurate.

FIG. 9 depicts another example user interface. The user interface in FIG. 9 includes data areas in the receipt image 802, and data items in the receipt data 904 for item 2 in the receipt image 802 when the data is correctly captured by the OCR engine 306. The data areas in the receipt image 802 include a vendor/merchant name 806, the transaction date 808, the item 2 description 910, the transaction amount 912, a credit/debit card type 814, and the credit/debit card number 816. The data items in the receipt data 904 for item 2 include a vendor/merchant name 918, the transaction date 920, the item 2 description 922, the transaction amount 924, the credit/debit card number 926, and the credit/debit card type 928. Additionally, the receipt data 904 depicted has a "cash" radio button 930 and a "credit" radio button 932, which is marked, because the item 2 transaction is a credit transaction. The figure illustrates that the OCR engine 306 identified the receipt data 904 for item 2 correctly and accurately because each data area in the receipt image 802 pertaining to item 2 has a corresponding data item in the receipt data 904 for item 2 that is correctly captured. Additionally, accuracy scale 934 indicates that the receipt data 904 is correct and accurate.

The user interfaces depicted in FIG. 10 and FIG. 11 illustrate how a user can improve the ability of the OCR engine 306 to capture data from receipt image data.

FIG. 10 depicts a case in which the OCR engine 306 is unable to identify the data items for item 1 correctly. In the case illustrated, the receipt image 1002 data areas include a vendor/merchant name 1006, the item 1 description 1008, the transaction amount 1010, the transaction date 1012, a credit/debit card type 1014, and the credit/debit card number 1016. The receipt image 1002 depicted in FIG. 10 is different from the receipt image 802, 902 respectively depicted in FIGS. 8 and 9 in that the transaction date area 1012 has a new location on the receipt image 1002. The transaction date area 1012 is now located near the credit/debit card type 1014 data area, instead of near the vender/merchant name data area 1006. The receipt data 1004 data items for item 1 include the vendor/merchant name 1018, the transaction date 1020, the item 1 description 1022, the transaction amount 1024, the credit/debit card number 1026, and the credit/debit card type 1028. The credit radio button 1032 is set. However, in the figure, the OCR engine 306 has left the transaction date 1020, the credit/debit card number 1026, and the credit/debit card type 1028 data items blank, because uncertainty parameters for the blank data items are below a given threshold. In this embodiment, the OCR engine 306 has thus illustrated the uncertainty parameters by leaving the transaction date 1020, the credit/debit card number 1026, and the credit/debit card type 1028 data items blank. Additionally, an accuracy scale 1034 indicates that the receipt data 1004 accuracy is below 100%.

FIG. 11 depicts the case in which a user provides missing data items to the data verifier. In FIG. 11, receipt image 1002 data areas include vendor/merchant name 1006, the item 1 description 1008, the transaction amount 1010, the transaction date 1012, the credit/debit card type 1014, and the credit/debit card number 1016. The data items for item 1 in the receipt data 1104 include the vendor/merchant name 1118, the transaction date 1120, the item 1 description 1122, the transaction amount 1124, the credit/debit card number 1126, and the credit/debit card type 1128. The credit radio button 1132 is set. In the figure, a user has filled in the transaction date 1120, the credit/debit card number 1126, and the credit/debit card type 1128, thereby raising the accuracy indicator 1134 to 100%. The user has also outlined or otherwise marked the data areas for the transaction date 1012, for the credit/debit card type 1014, and for the credit/debit card number 1016, so that the OCR engine 306 can better process this type of receipt image 1002 the next time it processes such a type. In one embodiment, a user outlines the un-captured data areas with colored boundaries that correlate with colored boundaries around the corresponding data items in the receipt data. For example, a user outlines: the data area for the transaction date 1012 on the receipt image 1002 with a blue rectangle, which corresponds with a blue rectangle surrounding the transaction date 1120 in the receipt data 1104; the data area for the credit/debit card type 1014 on the receipt image 1002 with a green rectangle, which corresponds with a green rectangle surrounding the credit/debit card type 1128 in the receipt data 1104; and the data area for the credit/debit card number 1016 on the receipt image 1002 with a brown rectangle, which corresponds with a brown rectangle surrounding the credit/debit card number 1126 in the receipt data 1104. Other markings that correlate the data areas in the receipt image 1002 with the data items in the receipt data 1104 can be used.

Sometimes the OCR engine captures a data area on the receipt image, but does so inaccurately. The data item in the receipt data is not blank but the data in the data item is not accurate according to the receipt image. FIGS. 12 and 13 illustrate this case.

In FIG. 12, some of the data items in the receipt data 1204 do not match the corresponding data areas in the receipt image 1202. In the figure, data areas of the receipt image 1202 include vendor/merchant name 1206, the transaction date 1208, the item description 1210, the transaction amount 1212, the credit/debit card type 1214, and the credit/debit card number 1216. The data items of the receipt data 1204 include the vendor/merchant name 1218, the transaction date 1220, the item description 1222, the transaction amount 1224, the credit/debit card number 1226, and the credit/debit card type 1228. The credit radio button 1232 is marked.

However, while the other captured data items in the receipt data 1204 for item 1 match the data areas in the receipt image for item 1, the transaction amount 1212 on the receipt image 1202 does not match the captured transaction amount 1224 in the receipt data 1204 and the credit/debit card number 1216 on the receipt image 1202 does not match the captured credit/debit card number 1226 in the receipt data 1204. Additionally, an accuracy scale 1234 indicates that the receipt data 1204 accuracy is less than 100%.

In FIG. 13, a user corrects the inaccurate data items in the receipt depicted in FIG. 12. In the figure, the data areas in receipt image 1302 include the vendor/merchant name 1306, the transaction date 1308, the item description 1310, the transaction amount 1312, the credit/debit card type 1314, and the credit/debit card number 1316. The data items in the receipt data 1304 include the vendor/merchant name 1318, the transaction data 1320, the item description 1322, the transaction amount 1324, the credit/debit card number 1326, and the credit/debit card type 1328. The credit radio button 1332 is marked. In the figure, a user has corrected the transaction amount 1324 and the credit/debit card number 1326 to match the data for those items in the receipt image 1302, thereby raising the accuracy indicator 1334 to 100%. The corrected transaction amount 1324 and credit/debit card number 1326 are supplied to the OCR engine 306 to improve its accuracy. Additionally, data areas 1312, 1316 for those items are delineated to further aid the OCR engine 306.

FIG. 14 depicts, in one embodiment, expense data 1400 for an expense report. The expense data includes expense item list 1402, a receipt data 1404 for an item, and a receipt image 1406. The expense item list 1402 includes one or more selectable expense items, item 1 1408 of which is selected. The data items in the receipt data 1404 for item 1 1408 include a vendor/merchant name 1412, the transaction date 1414, the transaction amount 1416, a credit/debit card number 1418, and the credit/debit card type 1420. The receipt image 1406 includes data areas that contain the vendor/merchant name 1436, the transaction date 1438, the item description 1440, the transaction amount 1442, the credit/debit card type 1444, and the credit/debit card number 1446. A marked button 1426 in the receipt data 1404 indicates that item 1 1410 is a corporate credit card transaction, rather than a cash transaction 1424 or a personal credit card transaction 1428. The expense data 1400 further includes a cancel button 1430, a save button 1432, and a submit button 1434. The cancel button 1430, when activated, prevents the expense data from being included in an expense report; the save button 1432, when activated, saves the expense data for later action, either a cancellation or a submission. The submit button 1434, when activated, assures that the expense data 1400 is part of an expense report.

Figure 15:
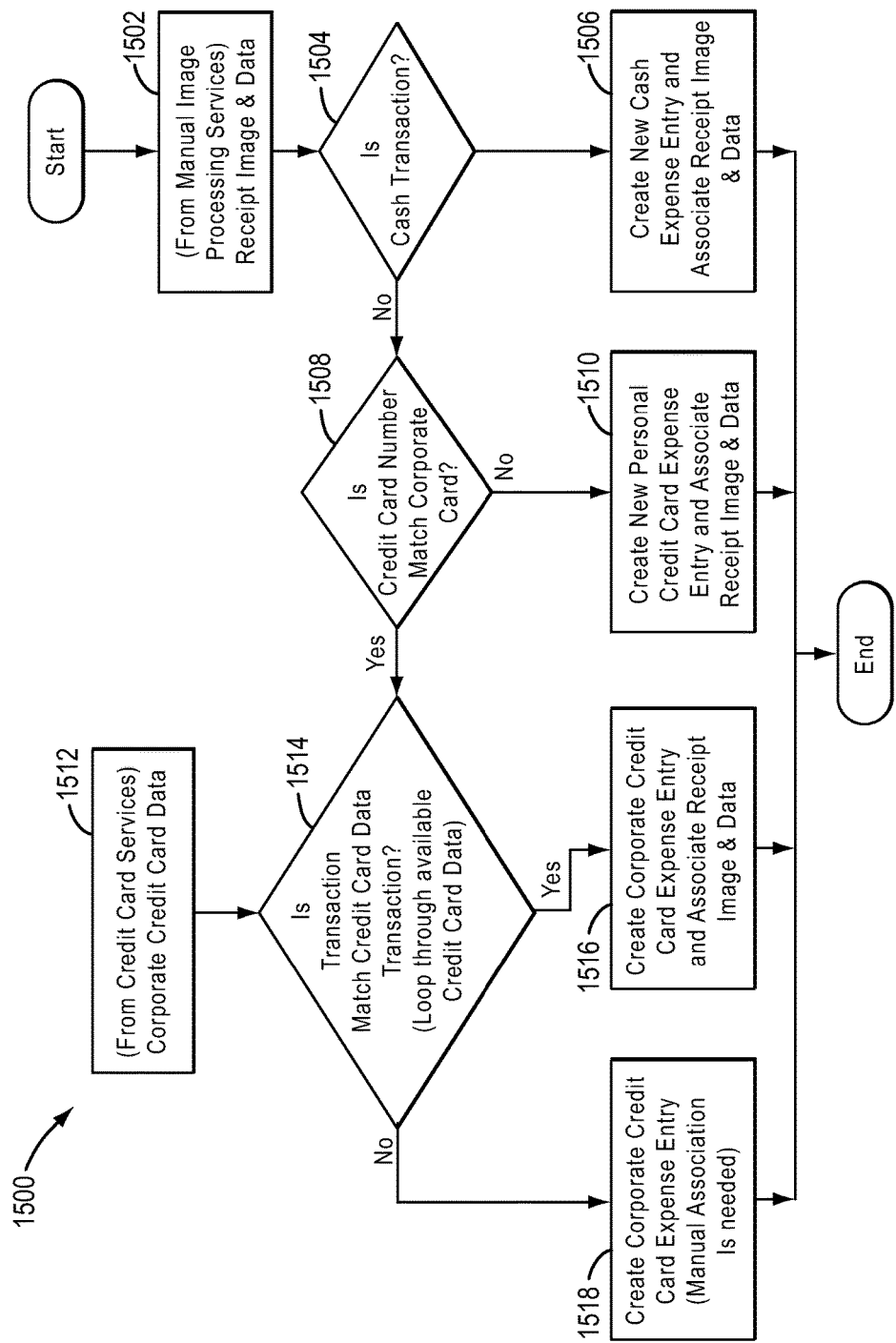
FIG. 15 depicts a flow, in one embodiment, of data extracted from receipts.

FIG. 15 depicts a flow, in one embodiment, of how the receipt data is associated with credit card transaction data and expense data is created in the expense management system. In step 1502, receipt image processing services 110, 208 provides the receipt image data 116 and the receipt data 118. In step 1504, the system checks the receipt image data 116 and receipt data 118 to determine whether the transaction is a cash transaction. If so, the system creates cash expense data and associates the cash expense data with the receipt image data 116 and receipt data 118 in step 1506. If the transaction is a credit transaction, as determined in step 1504, the system determines, in step 1508, whether the credit/debit card number on the receipt data 118 matches a corporate card number. If there is no match, as determined in step 1508, then the system creates new expense data for personal credit card transaction and associates the new expense data with receipt image data 116 and receipt data 118 in step 1510. If the credit/debit card number in the transaction is a corporate credit/debit card number, as determined in step 1508, then, in step 1514, the system compares the credit/debit card number with the credit card data 1512 available from corporate credit card services 108. If there is a match, as determined in step 1514, the system creates expense data for a corporate credit card transaction and associates the expense data with the receipt image data 116 and receipt data 118 in step 1516. If there is no match found between the corporate credit card data and the receipt data 118, as determined in step 1514, the system creates expense data with receipt image data 116 and receipt data 118, and a user manually associates, in step 1518, this expense data with credit card data and the receipt image data 116 and receipt data 118.

Figure 16:
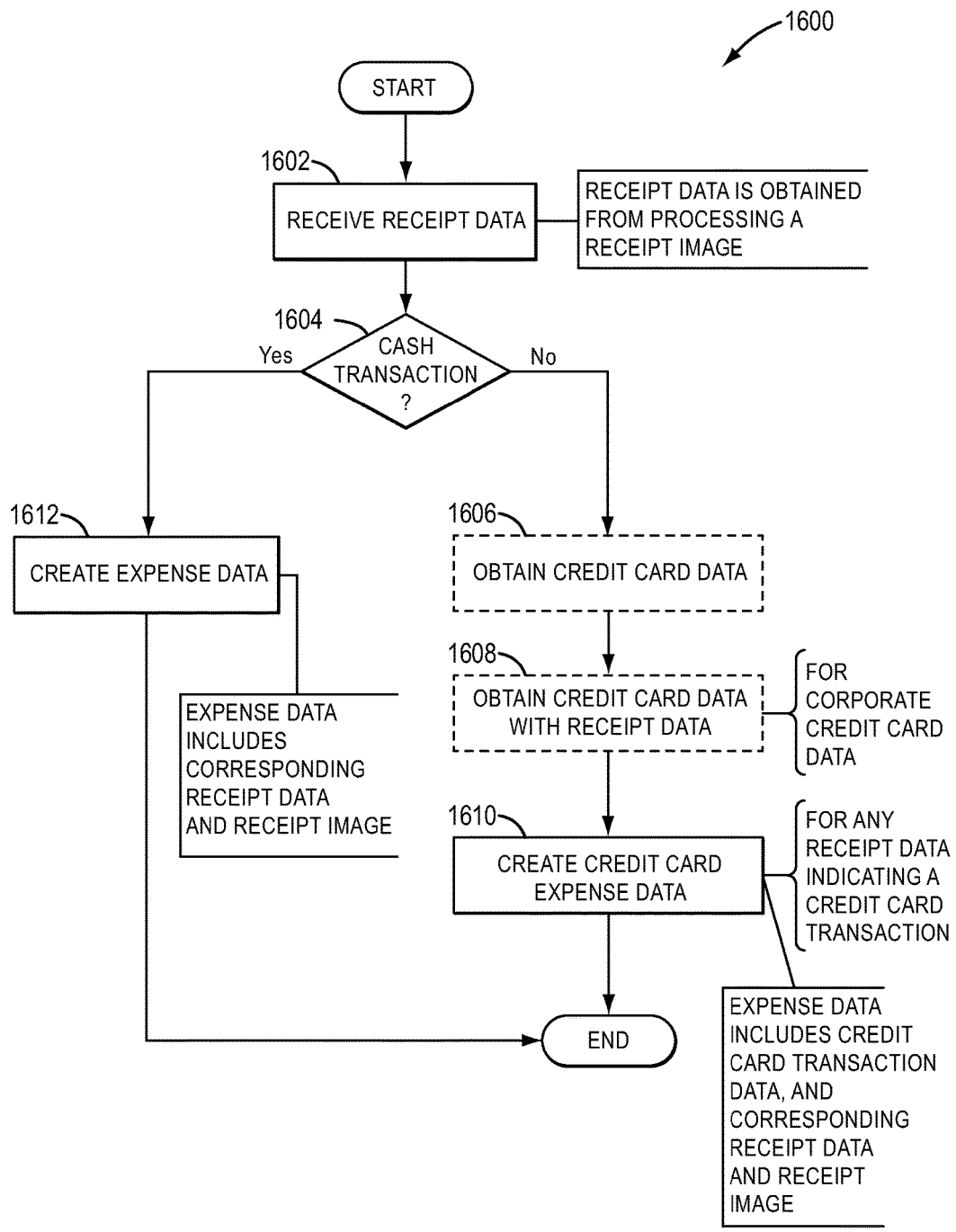
FIG. 16 depicts a flow in accordance with an embodiment.

FIG. 16 depicts a flow chart for an embodiment. In step 1602, the system receives receipt data 118 from receipt processing services 110. If the receipt data 118 indicates a credit transaction, as determined in step 1604, then, in optional step 1606, the system obtains credit card data. In optional step 1608, the system matches the credit card data with the receipt data 118, when the credit card data is corporate credit card data. In step 1610, the system creates credit card expense data for any receipt data 118 indicating a credit card transaction, where the expense data includes credit card transaction data, and corresponding receipt data 118 and receipt image data 116. If the receipt data 118 indicates a cash transaction, then, in step 1612, the system creates expense data, where the expense data includes the corresponding receipt data 118 and receipt image data 116.

Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 17:
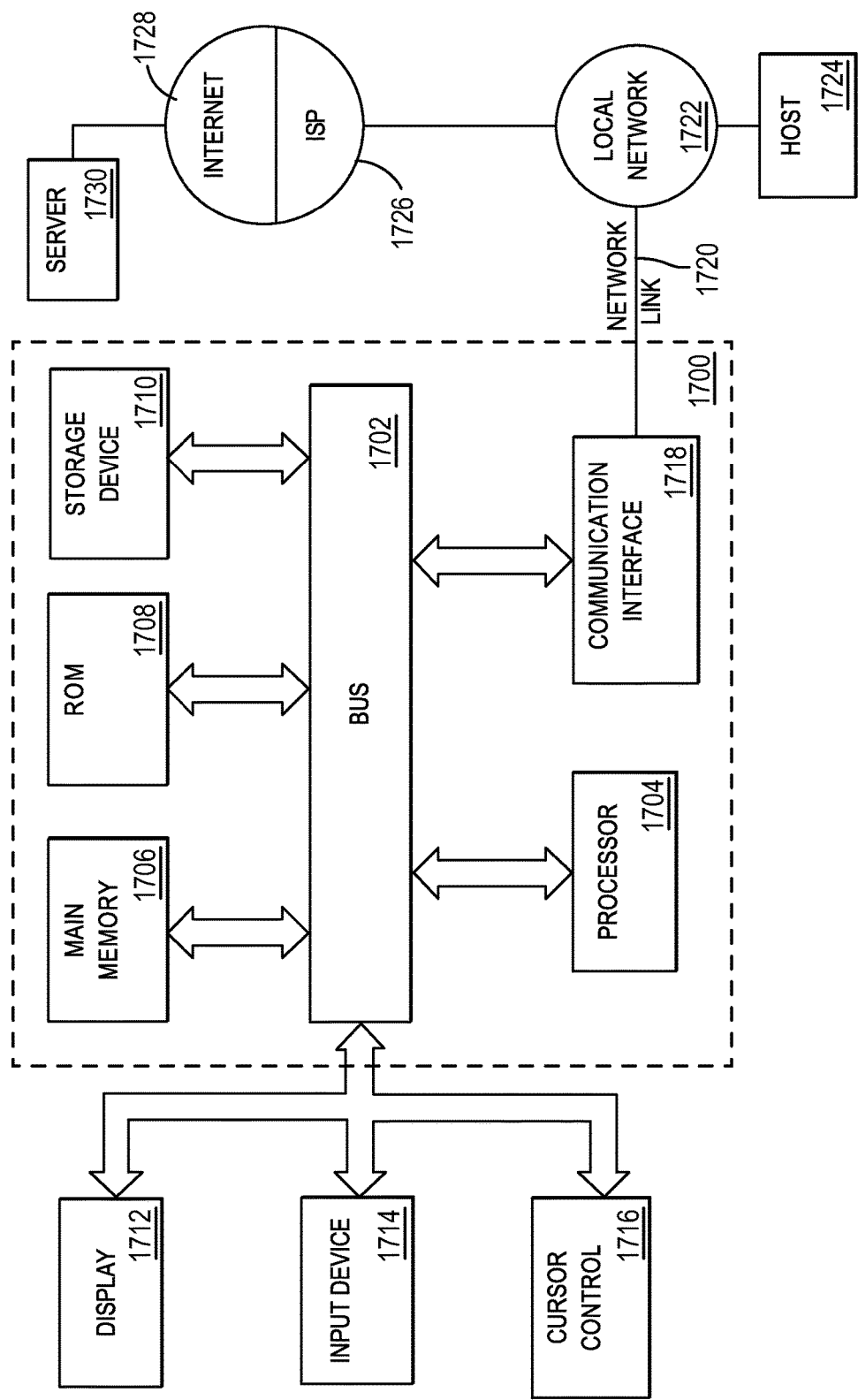
FIG. 17 is a block diagram that illustrates a computer system upon which an embodiment may be implemented.

For example, FIG. 17 is a block diagram that illustrates a computer system 1700 upon which an embodiment may be implemented. Computer system 1700 includes a bus 1702 or other communication mechanism for communicating information, and a hardware processor 1704 coupled with bus 1702 for processing information. Hardware processor 1704 may be, for example, a general-purpose microprocessor.

Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Such instructions, when stored in non-transitory storage media accessible to processor 1704, convert computer system 1700 into a special-purpose machine that is customized to perform the operations specified in the instructions.

Computer system 1700 further includes a read only memory (ROM) 1708 or other static storage device coupled to bus 1702 for storing static information and instructions for processor 1704. A storage device 1710, such as a magnetic disk or optical disk, is provided and coupled to bus 1702 for storing information and instructions.

Computer system 1700 may be coupled via bus 1702 to a display 1712, such as a cathode ray tube (CRT), for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

Computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1710. Volatile media includes dynamic memory, such as main memory 1706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid-state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718.

The received code may be executed by processor 1704 as it is received, and/or stored in storage device 1710, or other non-volatile storage for later execution.

Figure 18:
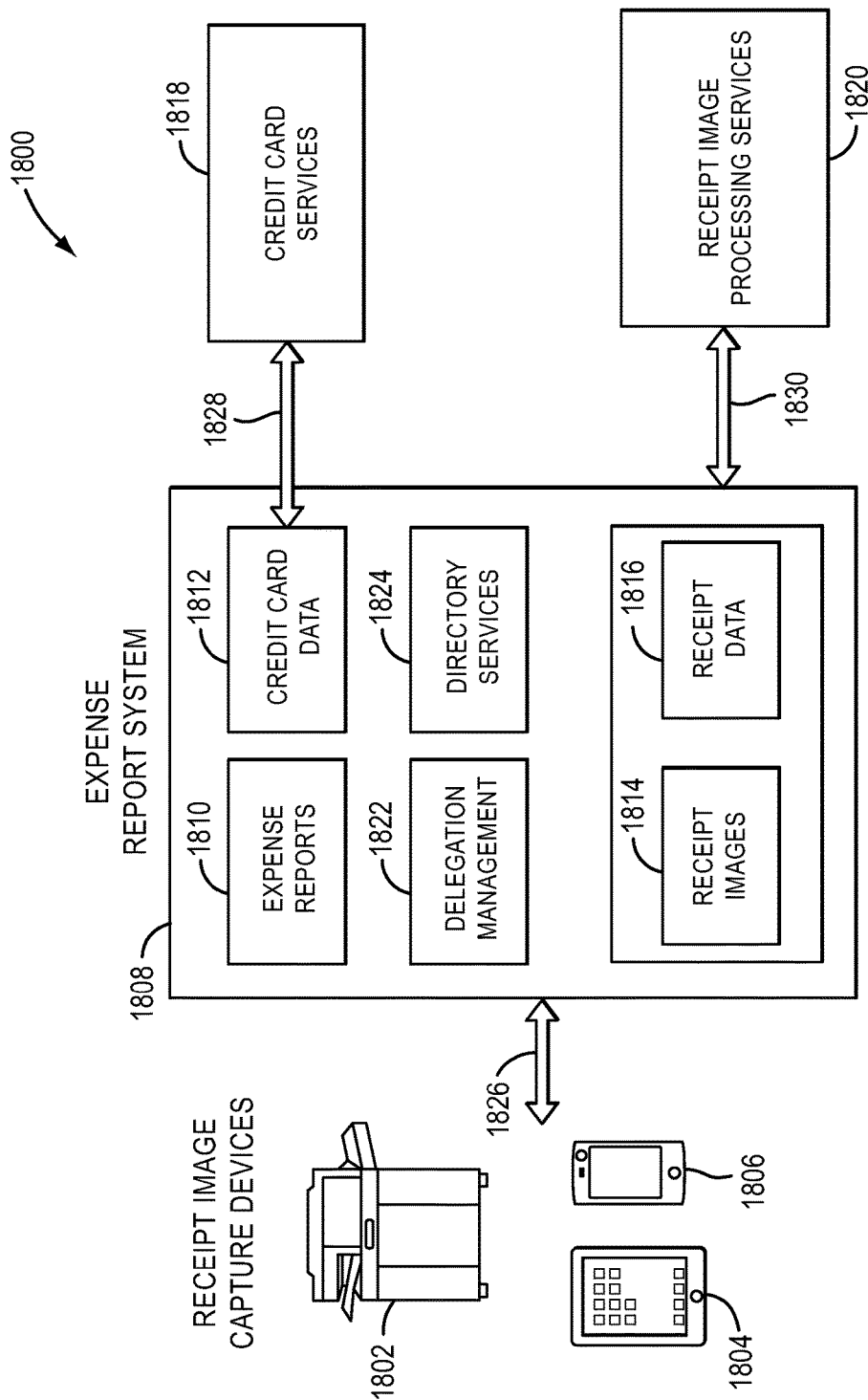
FIG. 18 is an embodiment that includes a delegation manager and a directory services module.

FIG. 18 depicts an example embodiment of an expense management system 1800. The system 1800 includes an expense report system 1808, one or more receipt capture devices 1802, 1804, 1806 coupled to the expense report system 1808 via link 1826, a credit card services 1818 coupled to the expense report system 1808 via link 1828, and receipt image processing services 1820 coupled to the expense report system 1808 via link 1830. The image capture devices, such as an all-in-one printer/scanner 1800, a tablet computer 1801, or a personal data device 1802, such as a smart phone, have the capability of scanning a physical document to provide an electronic representation of the document. In one embodiment, the physical document is a receipt and the electronic representation of the document is receipt image data.

The links 1826, 1828, and 1830 in the system 1800 can take various forms. In one embodiment, link 1826 is an Internet connection, link 1828 is an Internet connection, and link 1830 is an applications programming interface (API), such as an interface operating in accordance with the Simple Object Access Protocol (SOAP) or Representative State Transfer (REST), or Web APIs. In another embodiment, link 1826 is an intranet connection, link 1828 is an intranet connection, and link 1830 is an applications programming interface (API), such as SOAP/REST or Web APIs.

In system 1800, the credit card services 1818 is a facility that provides credit card transaction data to the expense report system over link 1828.

Receipt image processing services 1820 in system 1800 obtains an electronic representation of a document and extracts data from the document, which it provides to the expense report system 1808 via link 1830. In one embodiment, a receipt is the physical document, the electronic representation is receipt image data, and the extracted document data is receipt data. In an embodiment, an optical character recognition system extracts the receipt data from the receipt image data.

In management system 1800, the expense report system 1808 includes expense report 1810, credit card data 1812, a delegation manager 1822, and a directory services 1824. Credit card data 1812 accesses the credit card services 1818 through an applications programming interface (API) operating over link 1828. The data storage for receipt image data 1814 holds receipt image data obtained from an image capture device. The data storage for receipt data 1816 holds receipts data obtained from receipt images processing services 1820. The directory services 1824, in response to a search, provides employee information from a company directory. The delegation manager 1822 provides APIs and an interface for managing delegates so that the image capture devices 1802 1804 1806 can obtain delegate information.

Figure 19:
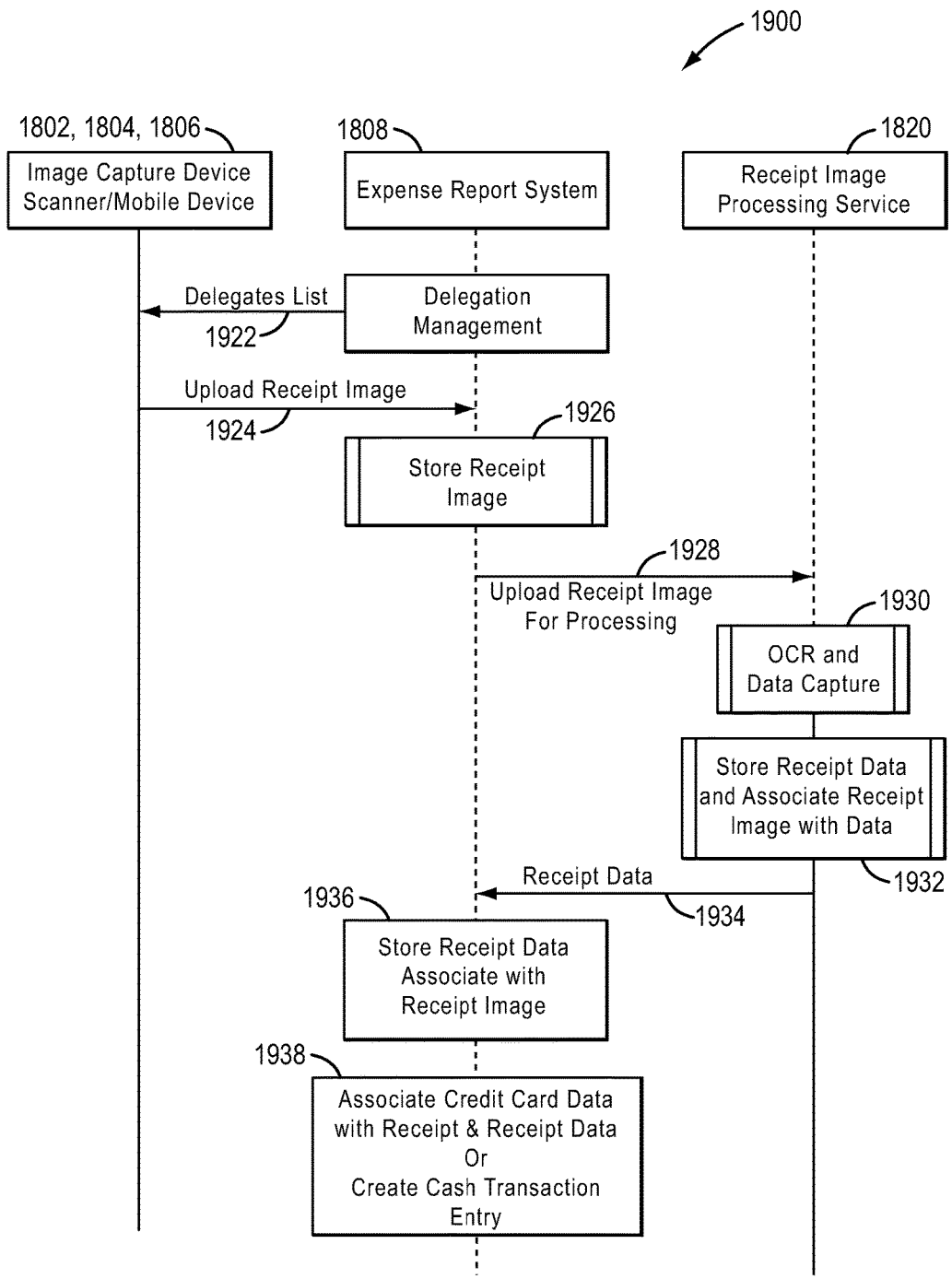
FIG. 19 depicts a data flow in accordance with the embodiment of FIG. 18.

FIG. 19 depicts a data flow in accordance with the embodiment of FIG. 18. The data flow depicted includes flow between the image capture devices 1802, 1804, 1806, the expense report system 1808, and receipt image processing services 1820.

In step 1922, an image capture device obtains data, such as a list, that includes identifiers of delegating persons and identifiers of delegated users. A delegated user is one of the users in a set of users authorized to operate the expense report system and the delegated user is granted a particular set of delegate rights to carry out operations in the expense report system on behalf of the delegating person. In one embodiment, the list includes identifiers of the delegating persons and an identifier of one user delegated to act on behalf of the delegating person and who is currently logged in to the system.

In step 1924, the user acting as a delegate or for him or herself, operates the image capture device 1802, 1804, 1806 to upload receipt image data representing a scanned receipt.

In step 1926, the expense report system stores the receipt image data.

In step 1928, the receipt image data is transferred to receipt image processing services 1820.

In step 1930, receipt image processing services performs a data extraction on the receipt image data, by optically recognizing characters in the receipt image data, to obtain receipt data and in step 1932 stores the receipt data and associated receipt image data. The receipt data contains information describing expense transaction.

In step 1934, receipt image processing services 1820 transfers the extracted receipt data to the expense report system 1808, which, in step 1936 stores the receipt data and associated receipt image data. In step 1938, if the transaction described in the receipt data is a credit card transaction, the expense report system associates credit card data obtained from the credit card services 1818 with the receipt image data and the receipt data for an expense item in an expense report. If the transaction is a cash transaction, the expense report system creates a cash transaction entry for an expense item in an expense report.

Figure 20:
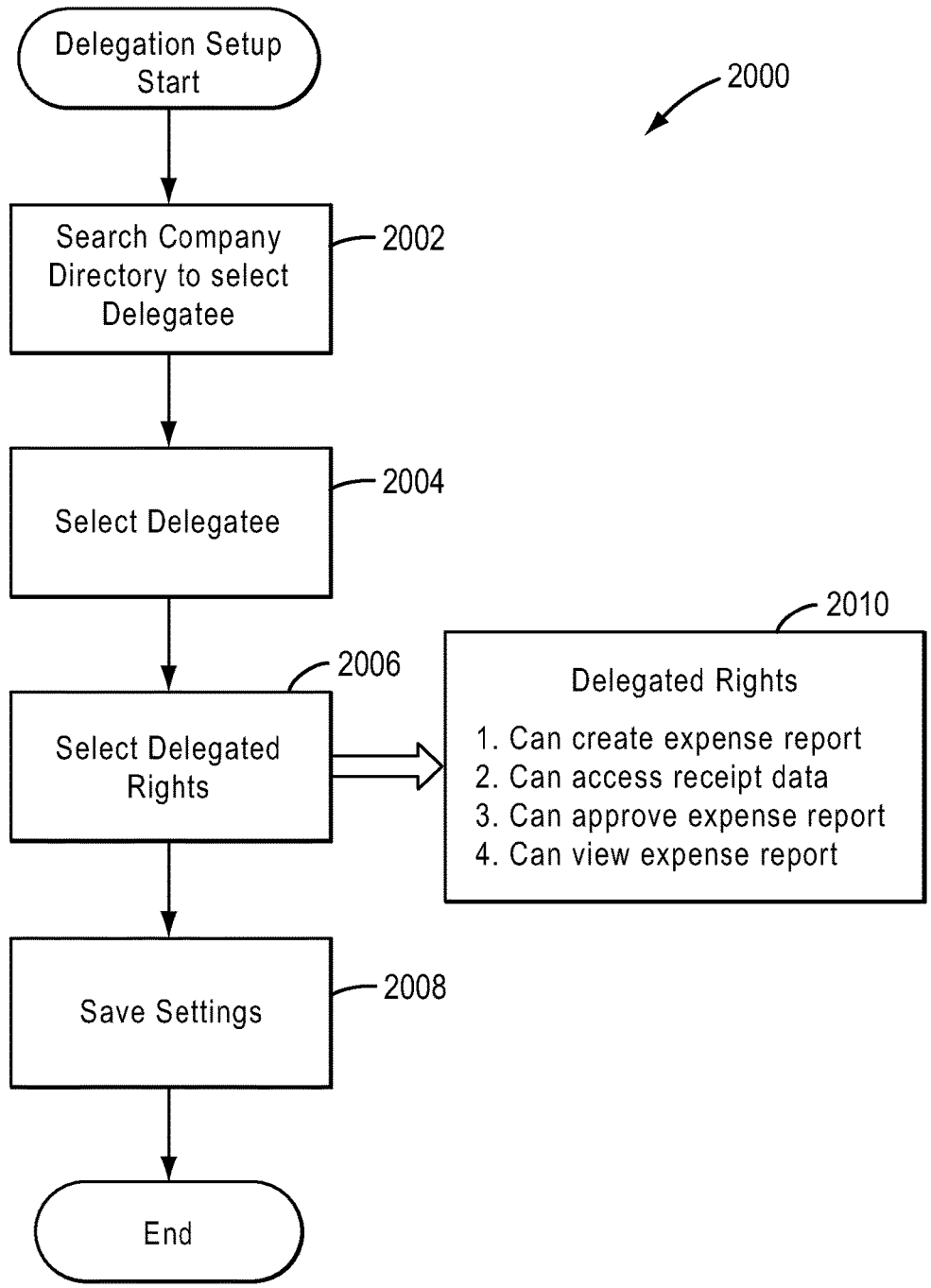
FIG. 20 depicts delegation set up process.

FIG. 20 depicts a delegation set up process. In step 2002, a person making a delegation, the delegating person, searches the company directory via the directory services module 1824 in FIG. 18 to select in step 2004 a delegate, i.e., a person who is permitted to act on behalf of the delegating person. The delegating person then sets, in step 2006, one or more delegated rights, which determine one or more workflows or other activities that the delegate is permitted to execute in the expense report system. The delegating person then saves, in step 2008, the settings via the delegation manager 1822 in FIG. 18. The one or more delegated rights include one or more of a permission to create an expense report, permission to access receipt data 1816, permission to approve an expense report, or a permission to view an expense report. The one or more permissions allow the delegated person to perform one or more workflows described below. A permission can allow any number of workflows. In one embodiment, a delegated right permits the delegate to execute all of the workflows. In another embodiment, a delegated right permits only viewing of the expense report.

Figure 21:
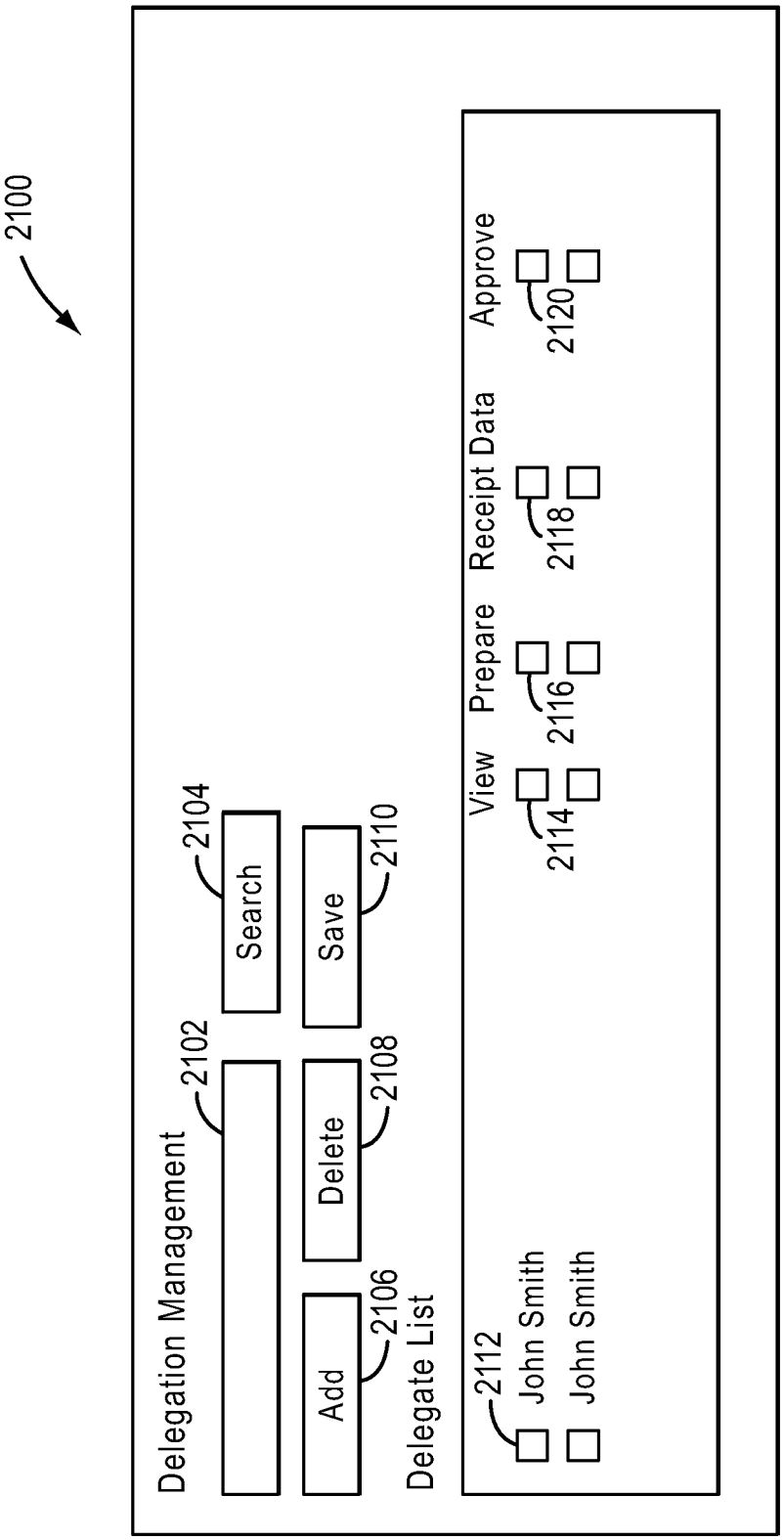
FIG. 21 depicts user interface screen for delegation management.

FIG. 21 depicts an example user interface for the delegation manager. The user interface includes a search button 2104 and associated search data box 2102, an area that includes a delegate list and the delegation rights for each person in the delegate list, and add 2106, delete 2108 and save buttons 2110. According to the figure, a delegating person can grant rights to a particular delegate by checking various boxes, such as view box 2114, prepare box 2116, receipt data box 2118, and approve box 2120. The view box 2114 grants permission to view an expense report. The prepare box 2116 grants permission to create an expense report. The receipt data box 2118 grants permission to access the receipt repository, which stores receipt data. The approve box 2120 grants permission to approve an expense report. In one embodiment, checking the receipt data box 2118 grants all of the other rights.

Figure 22A:
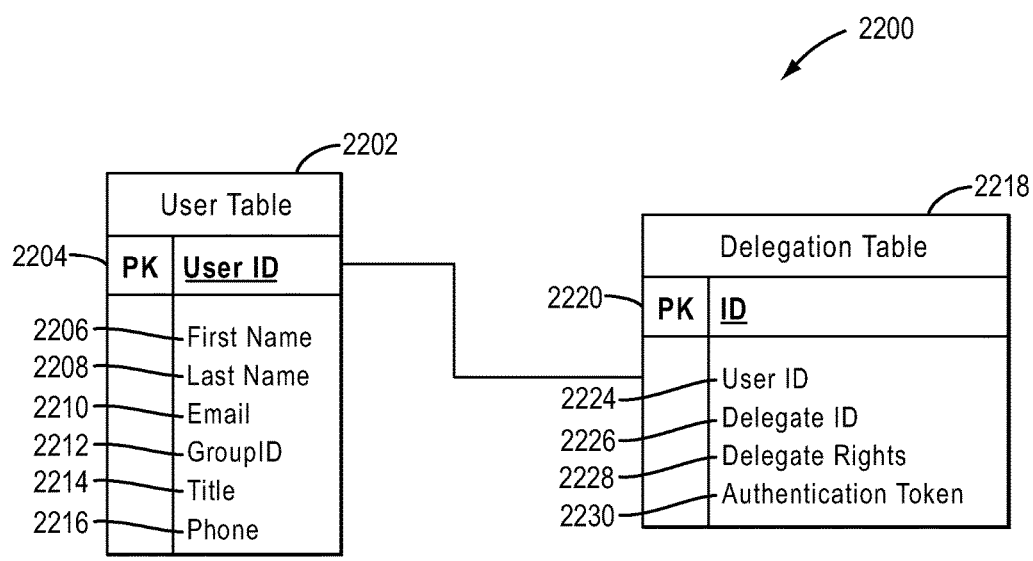
FIG. 22A depicts an example database schema for storing delegation information.

FIG. 22A depicts an example database schema for tracking delegation information. The schema includes a user table schema 2202 and a delegation table schema 2218, where a schema describes the names of the columns (table headings) for an entry (a tuple) in a user table. The columns in the user table tuple are:

{UserID, First Name 2206, Last Name 2208, Email 2210, GroupID 2212, Title 2214, Phone 2216}.

The user table is accessed via its primary key, which is a user ID 2204. The First Name and Last Name columns are the user's first and last name respectively. The Email column contains the user's email address. The Group ID column contains an ID of a group to which the user may belong. The Title Column contains the user's title in the organization and the Phone column contains the user's phone number.

The columns in a row of the delegation table (a table in accordance with the delegation table schema 2218) are:
{ID, UserID 2204, DelegateID 2226, Delegate Rights 2228, Authentication Token 2230}.

The delegation table is accessed via its primary key PK 2220, which uniquely identifies a row in the delegation table. Thus, each row in the delegation table identifies an association between a Delegate ID 2226, which is the ID of a delegating person, and a User ID 2224, which is the ID of a delegated user. If the table is sorted on the Delegate ID 2226, then the table provides a list of UserIDs 2224 for each Delegate ID 2226. If the table is sorted on the UserID 2224, then the table provides a list of Delegate IDs 2226 for each UserID 2224. The latter view is the same as the delegate list. The Delegate Rights 2228 are the one or more permissions granted to a delegate to perform operations in the expense report system 1808 on behalf of a delegating person. In one embodiment, the Delegate rights 2228 include permission to view an expense report, permission to prepare an expense report, permission to access receipt data, or permission to approve an expense report. The Authentication Token 2230 contains a token that can be used instead of a user's credentials such as a user ID and password.

FIG. 22B depicts an example user list and an example delegate list. The example user list is a table according to the schema 2202 in FIG. 22A. The example list includes five entries, each of which conforms to user table tuple described above. The example delegate list is a table according to the schema 2218 in FIG. 22A. The example includes five entries each of which conforms to the delegation table tuple described above. In the delegate list, User ID JDoe has two delegating persons, RSmith and NLu. The delegated rights for RSmith are '0F'='1111', which grants JDoe all permissions (i.e., view an expense report, create an expense report, access receipt data, and approve an expense report) on behalf of RSmith. The delegated rights for NLu are '0E'='1110', which grants to JDoe permission to view an expense report, permission to create an expense report, and permission to access receipt data on behalf of NLu.

Additionally, in the delegate list, user ID JWang has three delegating persons, RSmith, NLu, and TCook. For RSmith, JWang has delegated rights '0C'='1100', which gives JWang permission to view an expense report and to create and expense report on behalf of RSmith. For NLu, JWang has delegate rights '0E'='1110', which gives JWang permission to view an expense report, permission to prepare an expense report, and permission to access receipt data on behalf of NLu. For TCook, JWang has delegated rights '0F'='1111', which gives JWang permission to view an expense report, to create an expense report, to access receipt data, and to approve an expense report on behalf of TCook.

FIGS. 23A-23D depict example user interface screens on an image capture device. These user interface screens permit a user to login to his or her account and process receipt images for him or herself or for those who have delegated rights to that user.

Figure 23A:
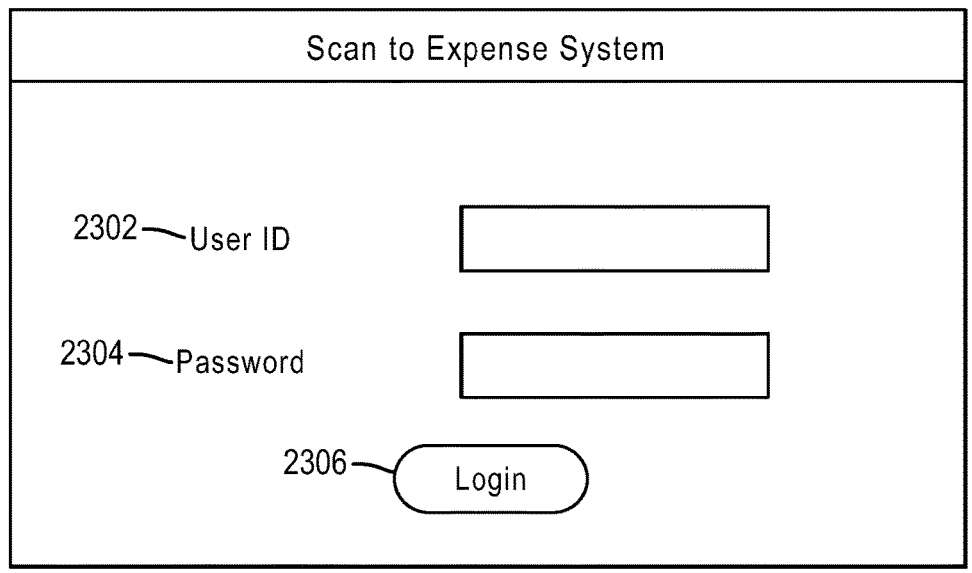

FIG. 23A depicts a login screen in which a particular user logs in to his or her expense management account or to act for another person. The user provides a userID 2302 and a password 2304 and activates the login button 2306.

Figure 23B:
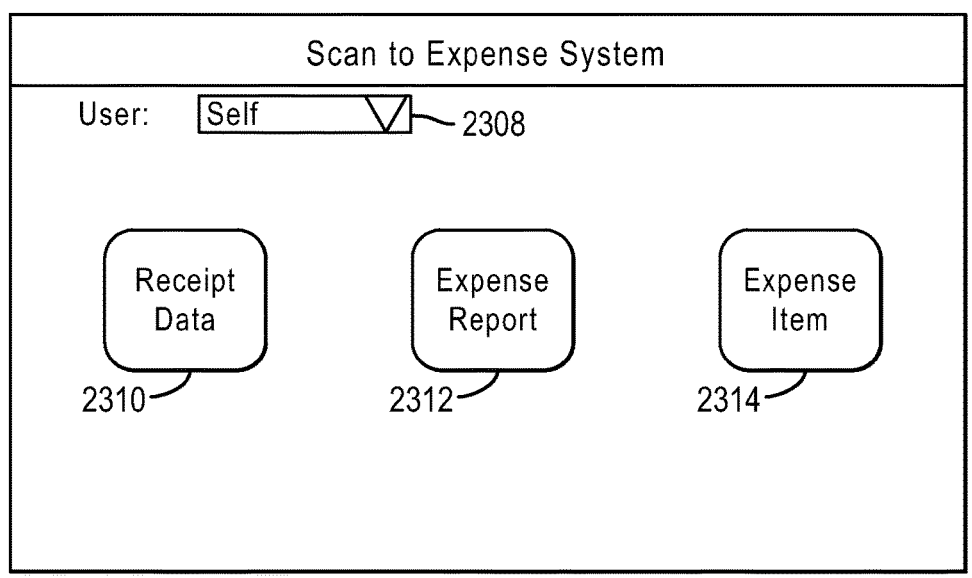

FIG. 23B depicts a screen permitting a user to selection one or more workflows. These workflows are permitted in accordance with the delegation rights granted to the currently logged-in user if the user is acting as a delegate or the rights are permitted without restriction if the user is acting for him or herself, as determined by the user selection box 2308. The screen permits the selection of the receipt data workflow via button 2310, expense report workflow via button 2312, or expense item workflow via button 2314.

Figure 23C:
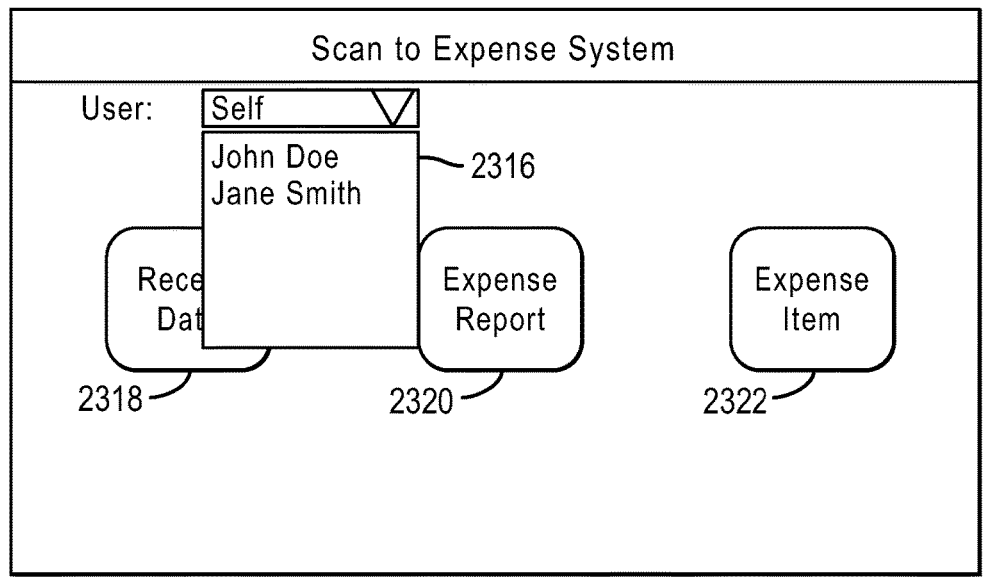

FIG. 23C depicts a screen with a drop-down list 2316, which permits selection of either the currently logged-in user or a delegating person, i.e., one who has delegated rights to the logged-in user. Thus, the logged-in user can perform operations in the system for him or herself or on behalf of a listed delegating person. Buttons 2318, 2320, and 2322 operate in a fashion similar to those in FIG. 23B.

Figure 23D:
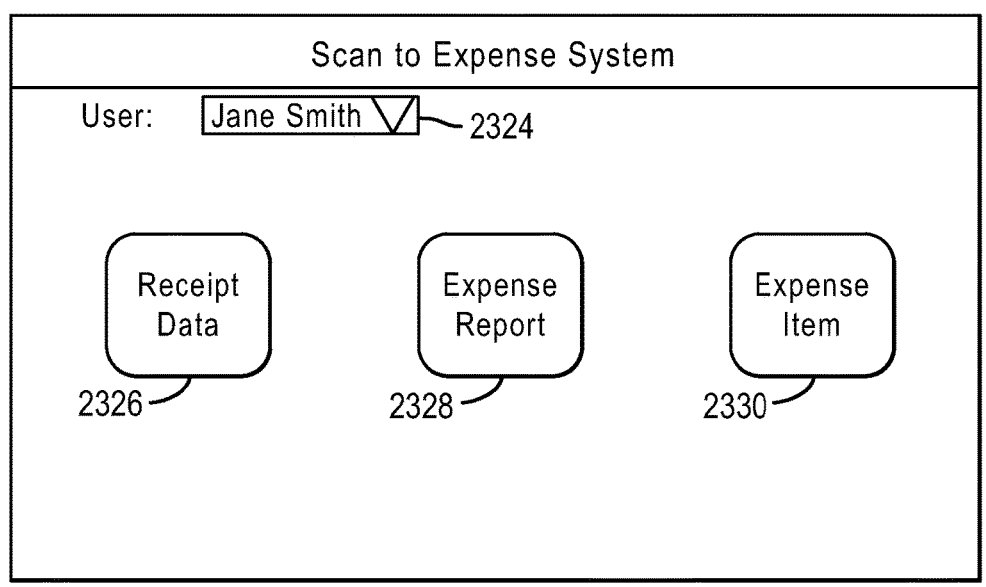

FIG. 23D depicts a screen in which the currently logged-in user selects a person "Jane Smith" who has delegated rights to the logged-in user. Buttons 2326, 2328, and 2330 operate in a fashion similar to those in FIG. 23B.

FIG. 23E depicts a screen for displaying an expense reports list in the scan to expense system workflow. The expense reports list allows the user to select an expense report type, such as office supplies 2334, computer accessories 2336, or business trips 2338.

FIG. 23F depicts a screen for displaying an expense item list in the scan to expense item system workflow. The screen permits items to be scanned for a particular expense report type, such as office supplies 2342, computer accessories 2344, or business trips 2346.

Figure 23G:
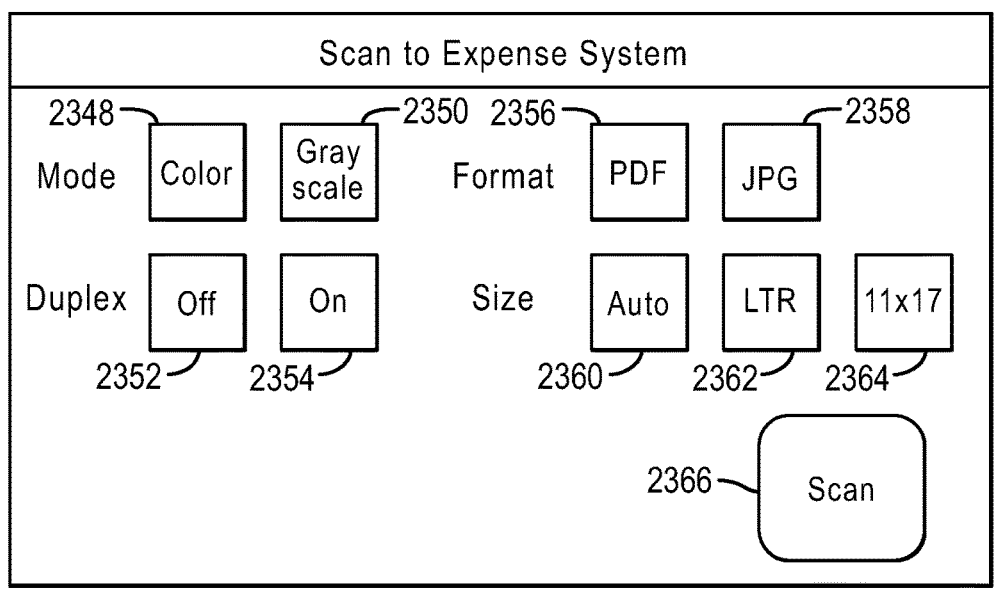

FIG. 23G depicts a screen for setting scan parameters in the scan to expense report workflow or scan to expense item workflow. The parameters include a mode setting such as color 2348 or gray scale 2350, a duplex setting on 2352 or off 2354, a format setting such as 'pdf' (Portable Document Format) 2356 or 'jpg' (Joint Photographic Experts Group) 2358 and a size setting such as auto size 2360, letter size 2362 or 11×17 size 2364. The scan button 2366 executes the scan according to the settings.

Figure 24A:
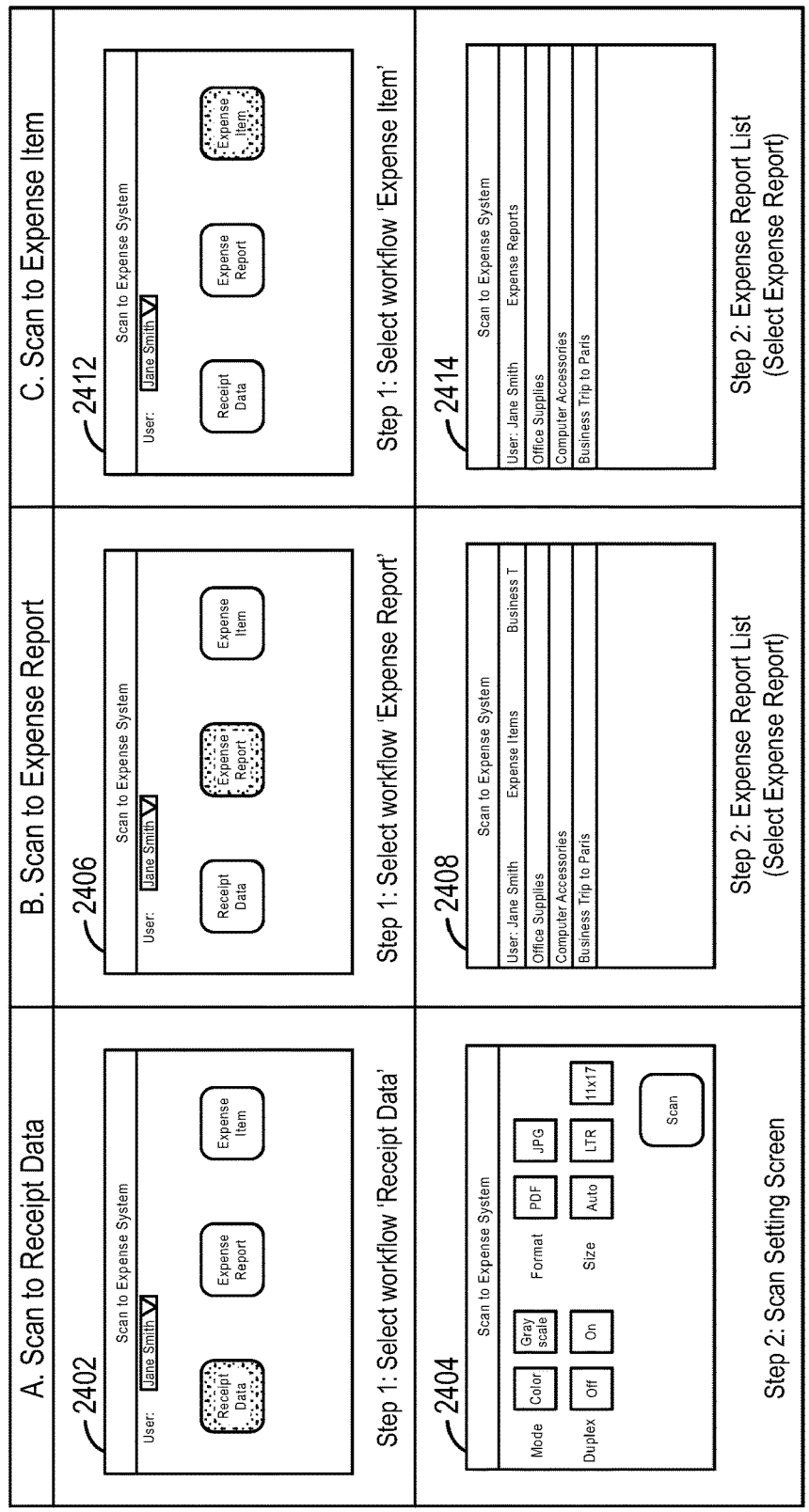

FIGS. 24A and 24B depict a set of screens detailing a workflow according to an embodiment. The workflows depicted include (A) scan to receipt data, (B) scan to expense report, and (C) scan to expense item.

Step 1 in FIG. 24A selects one of the three workflows via screen 2402, which is the same as the screen depicted in FIG. 23D. If scan to receipt data is selected, then in step 2, the scan setting screen 2404, which is the same as the screen depicted in FIG. 23G, is presented to the user who enters the scan parameters and starts a scan, completing the workflow.

In FIG. 24A, if scan to expense report is selected in step 1 via screen 2406, then in step 2, an expense report list, which is the same as the screen depicted in FIG. 23E, is presented to the user who selects one of the expense reports in the list. In step 3 in FIG. 24B, the scan setting screen, which is the same screen as the one depicted in FIG. 23G, is presented to the user, who enters the scan parameters and starts a scan, completing the workflow.

In FIG. 24A, if scan to expense item is selected in step 1, then, in step 2, an expense report list, which is the same as the screen depicted in FIG. 23E is presented to the user, who selects one of the expense reports in the list. In step 3 in FIG. 24B, an expense item list, which is the same as the screen depicted in FIG. 23F, for the selected expense report is presented to the user, who selects one of the expense items in the list. In step 4 in FIG. 24B, the scan setting screen, which is the same screen as the one depicted in FIG. 23G, is presented to the user, who enters the scan parameters and starts a scan, completing the workflow.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An expense management system providing an improvement in computer execution of workflows, the system comprising:
one or more processors;
one or more memories storing executable instructions to be executed by the one or more processors to cause:
an expense report system, comprising a delegation manager that is coupled to an image capture device to:
receive a request from a first user of a plurality of users of the expense management system to designate one or more delegates in the expense management system, wherein the one or more delegates are not permitted to execute workflows on behalf of the first user;
in response to receiving the request, generate and store delegate data in a first database through the delegation manager, wherein the first database comprises a delegation table and a user table, wherein the delegate data comprises, for each delegate of the one or more delegates, a first identifier that identifies the delegate, a second identifier that identifies the first user, and a set of delegate rights granted to the delegate, wherein the set of delegate rights indicates one or more workflows that the delegate is permitted to execute in the expense reporting system on behalf of the first user;
transmit delegate data from the delegation manager to the image capture device in response to a request of a second user of the plurality of users of the expense management system that is operating the image capture device;
based on the delegate data, determine a set of users on whose behalf the second user is permitted to execute workflows in the expense management system, the set of users including at least the first user and the second user, wherein the second user is not permitted to execute workflows on behalf of users other than the set of users;
permit the second user to selectively execute the one or more workflows in the expense report system on behalf of the first user; and
receive and process receipt data from a receipt image processing service in accordance with the one or more workflows; and
the receipt image processing service coupled to the expense report system comprising an OCR and data capture engine to:
optically recognize characters in receipt image data obtained from the image capture device to provide the receipt data to the expense report system for processing in accordance with at least one of the workflows;
wherein the receipt data comprises a plurality of data items and an uncertainty value associated with one or more particular data items of the plurality of data items;
wherein the uncertainty value provides an indication of an expected accuracy of the optically recognized characters of the one or more particular data items; and
store the receipt data in association with the first user in a second database coupled to the receipt image processing service and provide the receipt data to the expense report system using an Application Programming Interface (API).

2. The expense management system of claim 1, wherein the delegate rights include one or more of a permission to create an expense report, a permission to access receipt data, a permission to approve an expense report, or a permission to view an expense report.

3. The expense management system of claim 2,
wherein the expense report system includes one or more of a "scan to expense report" workflow or a "scan to expense item" workflow; and
wherein the permission to create an expense report allows the user to execute the "scan to expense report" workflow or the "scan to expense item" workflow.

4. The expense management system of claim 2,
wherein the expense report system includes a "scan to receipt data" workflow; and
wherein the permission to access receipt data allows the user to execute the "scan to receipt data" workflow.

5. The expense management system of claim 1,
wherein the first database stores the first identifier and the second identifier; and
wherein the second identifier is linked to the user table and wherein the user table includes a user ID as a primary key for the user table.

6. The expense management system of claim 1, wherein the second user is granted a particular set of delegate rights by the first user.

7. The expense management system of claim 1,
wherein the delegation manager provides a user interface screen on the image capture device; and
wherein the user interface screen includes check boxes for granting delegate rights to a user.

8. A non-transitory computer readable medium storing instructions for providing an improvement in computer execution of workflows through improved delegated operation in an expense report system, wherein processing the instructions by one or more processors causes:
receive, at a delegation manager, a request from a first user of a plurality of users of the expense management system to designate one or more delegates in the expense management system, wherein the one or more delegates are not permitted to execute workflows on behalf of the first user;
in response to receiving the request, generate and store delegate data in a first database through the delegation manager, wherein the first database comprises a delegation table and a user table, wherein the delegate data comprises, for each delegate of the one or more delegates, a first identifier that identifies the delegate, a second identifier that identifies the first user, and a set of delegate rights granted to the delegate, wherein the set of delegate rights indicates one or more workflows that the delegate is permitted to execute in the expense reporting system on behalf of the first user;
in response to a request of a second user of the plurality of users of the expense report system that is operating an image capture device, transmitting delegate data to the image capture device;
based on the delegate data, determine a set of users on whose behalf the second user is permitted to execute workflows in the expense management system, the set of users including at least the first user and the second user, wherein the second user is not permitted to execute workflows on behalf of users other than the set of users;

permitting the second user to selectively execute the one or more workflows in the expense report system on behalf of the first user; and receiving and processing receipt data from a receipt image processing service in accordance with the one or more workflows; and using the receipt image processing service, optically recognizing characters in receipt image data obtained from the image capture device to provide the receipt data to the expense report system for processing in accordance with at least one of the workflows;

wherein the receipt data comprises a plurality of data items and an uncertainty value associated with one or more particular data items of the plurality of data items;

wherein the uncertainty value provides an indication of an expected accuracy of the optically recognized characters of the one or more particular data items; and storing the receipt data in association with the first user in a second database coupled to the receipt image processing service and providing the receipt data to the expense report system using an Application Programming Interface (API).

9. The non-transitory computer readable medium of claim 8, wherein the delegate rights include one or more of a permission to create an expense report, a permission to access receipt data, a permission to approve an expense report, or a permission to view an expense report.

10. The non-transitory computer readable medium of claim 9,
wherein the expense report system includes one or more of a "scan to expense report" workflow or a "scan to expense item" workflow; and
wherein the permission to create an expense report allows the user to execute the "scan to expense report" workflow or the "scan to expense item" workflow.

11. The non-transitory computer readable medium of claim 9,
wherein the expense report system includes a "scan to receipt data" workflow; and
wherein the permission to access a receipt data allows the user to execute the "scan to receipt data" workflow.

12. The non-transitory computer readable medium of claim 8,
wherein the computer readable medium includes instructions that reference the first database that stores the first identifier and the second identifier; and
wherein the second identifier is linked to the user table and wherein the user table includes a user ID as a primary key for the user table.

13. The non-transitory computer readable medium of claim 12, wherein the second user is granted a particular set of delegate rights by the first user.

14. The non-transitory computer readable medium of claim 8,
wherein the computer readable medium further includes instructions that provide a user interface screen on the image capture device; and
wherein the user interface screen includes check boxes for granting delegate rights to a user.

15. A method for providing an improvement in computer execution of workflows through improved delegated operation in an expense report system, the method comprising:
receiving, at a delegation manager, a request from a first user of a plurality of users of the expense management system to designate one or more delegates in the expense management system, wherein the one or more delegates are not permitted to execute workflows on behalf of the first user;

in response to receiving the request, generating and storing delegate data in a first database through the delegation manager, wherein the first database comprises a delegation table and a user table, wherein the delegate data comprises, for each delegate of the one or more delegates, a first identifier that identifies the delegate, a second identifier that identifies the first user, and a set of delegate rights granted to the delegate, wherein the set of delegate rights indicates one or more workflows that the delegate is permitted to execute in the expense reporting system on behalf of the first user;

in response to a request of a second user of the plurality of users of the expense report system that is operating an image capture device, transmitting delegate data to the image capture device;

based on the delegate data, determining a set of users on whose behalf the second user is permitted to execute workflows in the expense management system, the set of users including at least the first user and the second user, wherein the second user is not permitted to execute workflows on behalf of users other than the set of users;

receiving receipt image data for a transaction from the image capture device;

receiving receipt data that includes one or more data items pertaining to the transaction,
wherein the one or more data items are obtained from characters optically recognized in the receipt image data,
wherein the receipt data comprises an uncertainty value associated with one or more particular data items of the one or more data items,
wherein the uncertainty value provides an indication of an expected accuracy of the optically recognized characters of the one or more particular data items, and
wherein the receipt data includes data indicating that the transaction is a credit card transaction; and storing the receipt data in association with the first user in a second database and providing the receipt data to the expense report system using an API; and creating expense data for an expense report,
wherein the expense data includes the receipt data and the receipt image data associated with the receipt data for the transaction,
wherein the receipt data includes credit card data relating to the credit card transaction, and
wherein creating the expense data for the expense report includes receiving receipt data in accordance with the one or more workflows and permitting the second user to selectively execute the one or more workflows in the expense report system permitted by the particular set of delegate rights granted to the second user.

16. The method of claim 15, wherein the delegate rights include one or more of a permission to create an expense report, permission to access receipt data, permission to approve an expense report, or permission to view an expense report.

17. The method of claim 16,
wherein the expense report system includes one or more of a "scan to expense report" workflow or a "scan to expense item" workflow; and wherein the permission to create an expense report allows the user to execute the "scan to expense report" workflow or the "scan to expense item" workflow.

18. The method of claim 16,
wherein the expense report system includes a "scan to receipt data" workflow; and
wherein the permission to access receipt data allows the user to execute the "scan to receipt data" workflow.

19. The method of claim 15,
further comprising accessing the first database to obtain the first identifier and the second identifier; and
wherein the second identifier is linked to the user table and wherein the user table includes a user ID as a primary key for the user table.

20. The method of claim 19, wherein the second user is granted a particular set of delegate rights by the first user.

* * * * *